United States Patent
Sato et al.

(10) Patent No.: US 7,672,015 B2
(45) Date of Patent: Mar. 2, 2010

(54) PRINTING METHOD AND SYSTEM FOR CONVERTING COLOR TONES TO LIGHTER AND DARKER VALUES FOR PRINTING WITH LIGHT AND DARK INKS

(75) Inventors: Akito Sato, Matsumoto (JP); Yoshiko Hoshiyama, Shiojiri (JP); Hirokazu Nunokawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 526 days.

(21) Appl. No.: 11/713,664

(22) Filed: Mar. 5, 2007

(65) Prior Publication Data
US 2007/0216919 A1 Sep. 20, 2007

(30) Foreign Application Priority Data
Mar. 6, 2006 (JP) ............................... 2006-059777

(51) Int. Cl.
- H04N 1/50 (2006.01)
- H04N 1/52 (2006.01)
- B41J 2/21 (2006.01)
- B41J 2/205 (2006.01)

(52) U.S. Cl. ..................... 358/1.9; 358/502; 358/521; 358/534; 347/12; 347/15; 347/43; 347/100

(58) Field of Classification Search .................. 358/1.9, 358/502, 521, 534; 347/9, 12, 14, 15, 43, 347/100
See application file for complete search history.

(56) References Cited

U.S. PATENT DOCUMENTS

| | | | | |
|---|---|---|---|---|
| 4,855,753 A | * | 8/1989 | Ichikawa et al. | 347/43 |
| 5,142,374 A | * | 8/1992 | Tajika et al. | 358/534 |
| 6,079,824 A | * | 6/2000 | Gotoh | 347/100 |
| 6,099,105 A | * | 8/2000 | Kakutani | 347/15 |
| 6,158,834 A | * | 12/2000 | Kato et al. | 358/502 |
| 6,234,600 B1 | * | 5/2001 | Danzuka et al. | 358/1.9 |
| 6,341,841 B1 | * | 1/2002 | Shimada et al. | 347/43 |
| 7,246,869 B2 | * | 7/2007 | Tanaka et al. | 347/15 |

FOREIGN PATENT DOCUMENTS

JP 10-193587 A 7/1998

\* cited by examiner

*Primary Examiner*—Scott A Rogers
(74) *Attorney, Agent, or Firm*—Sughrue Mion, PLLC

(57) ABSTRACT

The present invention provides a printing method including: (A) converting a tone value indicating a tone of a certain color to a first light tone value indicating a tone of a light color using a predetermined number of tones, and a first dark tone value indicating a tone of a dark color using a predetermined number of tones; (B) converting the first light tone value to a second light tone value indicating a tone of the light color with a smaller number of tones than the predetermined number of tones, based on a table for the light color; (C) converting the first dark tone value to a second tone value indicating a tone of the dark color with a smaller number of tones than the predetermined number of tones, based on a table for the dark color other than the table for the light color; (D) ejecting a light ink based on the second light tone value to form a light dot in the light ink on a medium, ejecting a dark ink based on the second dark tone value to form a dark dot in the dark ink on the medium, and expressing a tone of the certain color on the medium with the light dot and the dark dot.

6 Claims, 17 Drawing Sheets

PRINTING METHOD AND SYSTEM FOR CONVERTING COLOR TONES TO LIGHTER AND DARKER VALUES FOR PRINTING WITH LIGHT AND DARK INKS

CROSS-REFERENCE TO RELATED APPLICATIONS

The present application claims priority upon Japanese Patent Application No. 2006-059777 filed on Mar. 6, 2006, which is herein incorporated by reference.

BACKGROUND

1. Field of the Invention

The present invention relates to printing methods and printing systems.

2. Related Art

Examples of an inkjet printing apparatus which ejects ink from its head include printers, plotters and fax machines. In such a printing apparatus, ink ejected from the head lands on a medium (paper, cloth, OHP sheet or the like) to form dots. It is possible to realize a plurality of tones for one pixel by changing the amount of ink ejected to change the size of dots formed on the medium (see JP-A-10-193587).

Some printing apparatuses use light ink and dark ink in order to realize smooth graduation. However, improving image quality is sometimes difficult when light-ink dots and dark-ink dots are generated under the same conditions.

SUMMARY

An object of the present invention is to enable light-ink dots and dark-ink dots to be generated under different conditions.

In order to achieve the above-described object, the present invention is characterized in including: converting a tone value indicating a tone of a certain color to a first light tone value indicating a tone of a light color using a predetermined number of tones, and a first dark tone value indicating a tone of a dark color using a predetermined number of tones; converting the first light tone value to a second light tone value indicating a tone of the light color with a smaller number of tones than the predetermined number of tones, based on a table for the light color; converting the first dark tone value to a second tone value indicating a tone of the dark color with a smaller number of tones than the predetermined number of tones, based on a table for the dark color other than the table for the light color; ejecting a light ink based on the second light tone value to form a light dot in the light ink on a medium; ejecting a dark ink based on the second dark tone value to form a dark dot in the dark ink on the medium; and expressing a tone of the certain color on the medium with the light dot and the dark dot.

Other features of the present invention will become clear by reading the description of the present specification with reference to the accompanying drawings.

BRIEF DESCRIPTION OF THE DRAWINGS

FIG. 16A shows the appearance status of the comparative example, and FIG. 16B shows the appearance status of the present embodiment.

In FIG. 17, the ink consumption amount in the comparative example and the present embodiment is shown.

DESCRIPTION OF EXEMPLARY EMBODIMENTS

Figure 1:
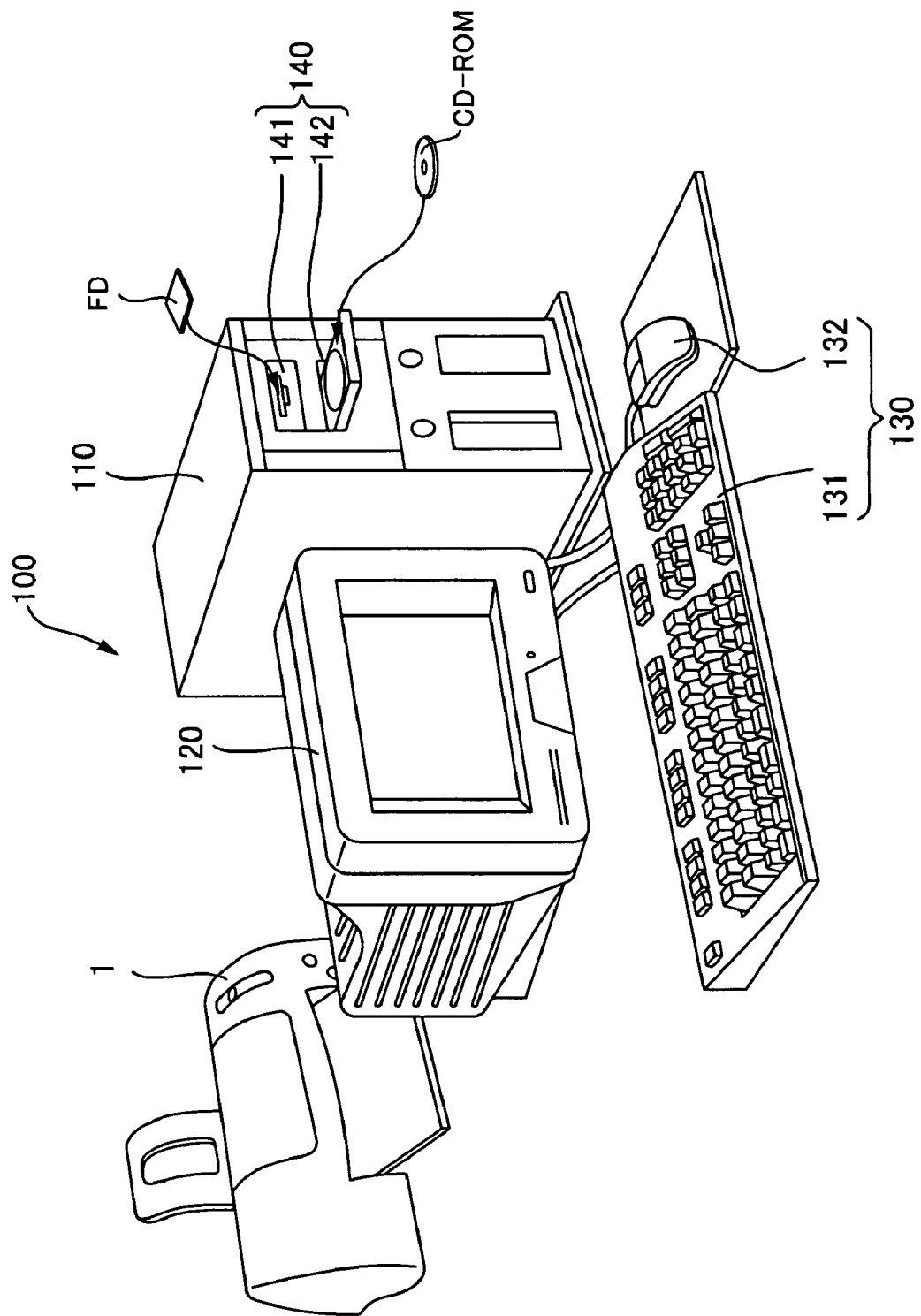
FIG. 1 is a diagram for explaining a configuration of a printing system 100.

At least the following matters will be made clear by the explanation in the present specification and the description of the accompanying drawings.

The present invention provides a printing method including: converting a tone value indicating a tone of a certain color to a first light tone value indicating a tone of a light color using a predetermined number of tones, and a first dark tone value indicating a tone of a dark color using a predetermined number of tones; converting the first light tone value to a second light tone value indicating a tone of the light color with a smaller number of tones than the predetermined number of tones, based on a table for the light color; converting the first dark tone value to a second tone value indicating a tone of the dark color with a smaller number of tones than the predetermined number of tones, based on a table for the dark color other than the table for the light color; ejecting a light ink based on the second light tone value to form a light dot in the light ink on a medium; ejecting a dark ink based on the second dark tone value to form a dark dot in the dark ink on the medium; and expressing a tone of the certain color on the medium with the light dot and the dark dot.

With such a printing method, it is possible to generate light dots in light ink and dark dots in dark ink under different conditions, and therefore the image quality can be improved.

In such a printing method, it is preferable that the table for the light color and the table for the dark color are set such that a maximum number of the light dots per unit area is different from a maximum number of the dark dots per unit area. With such a printing method, it is possible to separately set the maximum number of the light dots and the dark dots per unit area, and therefore the image quality can be improved.

In such a printing method, it is preferable that the light dot can be formed in a plurality of sizes depending on the second light tone value, and the dark dot can be formed in a plurality of sizes depending on the second dark tone value. Also it is preferable that the table for the light color and the table for the dark color are set such that a maximum number of the light dots in the smallest size per unit area is larger than a maximum number of the dark dots in the smallest size per unit area. The reason for this is as follows. That is, dots in the smallest size are susceptible to flight path deviation and thus a shift in landing position, and dark dots are highly noticeable. Therefore, it is desired to reduce the number of dark dots in the smallest size per unit area. On the other hand, light dots in the smallest size are not so noticeable even if their landing position is shifted, and thus the number of light dots in the smallest size per unit area does not need to be reduced. Also in order to avoid appearance of dark dots at a low tone value, it is better not to reduce the number of light dots per unit area.

It is preferable that the table for the light color and a dither matrix are used in converting the first light tone value to the second light tone value, and the table for the dark color and the dither matrix are used in converting the first dark tone value to the second dark tone value.

The present invention provides a computer program for causing a printing system that forms a light dot in light ink and a dark dot in dark ink on a medium so as to express tone of a certain color on the medium with the light dot and the dark dot to convert a tone value indicating a tone of the certain color to a first light tone value indicating a tone of a light color using a predetermined number of tones, and a first dark tone value indicating a tone of a dark color using a predetermined number of tones;

convert the first light tone value to a second light tone value indicating a tone of the light color with a smaller number of tones than the predetermined number of tones, based on a table for the light color;

convert the first dark tone value to a second tone value indicating a tone of the dark color with a smaller number of tones than the predetermined number of tones, based on a table for the dark color other than the table for the light color;

eject the light ink based on the second light tone value, and form the light dot in the light ink on a medium; and eject the dark ink based on the second dark tone value, and form the dark dot in the dark ink on the medium.

With such a program, since it is possible to generate light dots in light ink and dark dots in dark ink under different conditions, the image quality can be improved.

The present invention provides a printing system, wherein a tone value indicating a tone of a certain color is converted to a first light tone value indicating a tone of a light color using a predetermined number of tones, and a first dark tone value indicating a tone of a dark color using a predetermined number of tones, the first light tone value is converted to a second light tone value indicating a tone of the light color with a smaller number of tones than the predetermined number of tones, based on a table for the light color, the first dark tone value is converted to a second tone value indicating a tone of the dark color with a smaller number of tones than the predetermined number of tones, based on a table for the dark color other than the table for the light color;

a light ink is ejected based on the second light tone value to form a light dot in the light ink on a medium, and a dark ink is ejected based on the second dark tone value to form a dark dot in the dark ink on the medium, and a tone of the certain color is expressed on the medium with the light dot and the dark dot.

With such a printing system, since it is possible to generate light dots in light ink and dark dots in dark ink under different conditions, the image quality can be improved.

Configuration of the Printing System

Regarding Overall Configuration

FIG. 1 is a diagram for explaining the configuration of a printing system 100. The illustrated printing system 100 includes a printer 1 as a printing apparatus and a computer 110 as a print control apparatus. More specifically, the printing system 100 has the printer 1, the computer 110, a display device 120, an input device 130, and a recording and reproducing device 140.

The printer 1 prints images on media such as paper, cloth, and film. The computer 110 is communicably connected to the printer 1. In order to print an image with the printer 1, the computer 110 outputs print data corresponding to that image to the printer 1. The computer 110 has computer programs such as an application program and a printer driver installed thereon. The display device 120 includes a display. The display device 120 is for displaying, for example, a user interface of the computer programs. The input device 130 is, for example, a keyboard 131 and a mouse 132. The recording and reproducing device 140 is, for example, a flexible disk drive device 141 and a CD-ROM drive device 142.

The Computer

Figure 2:
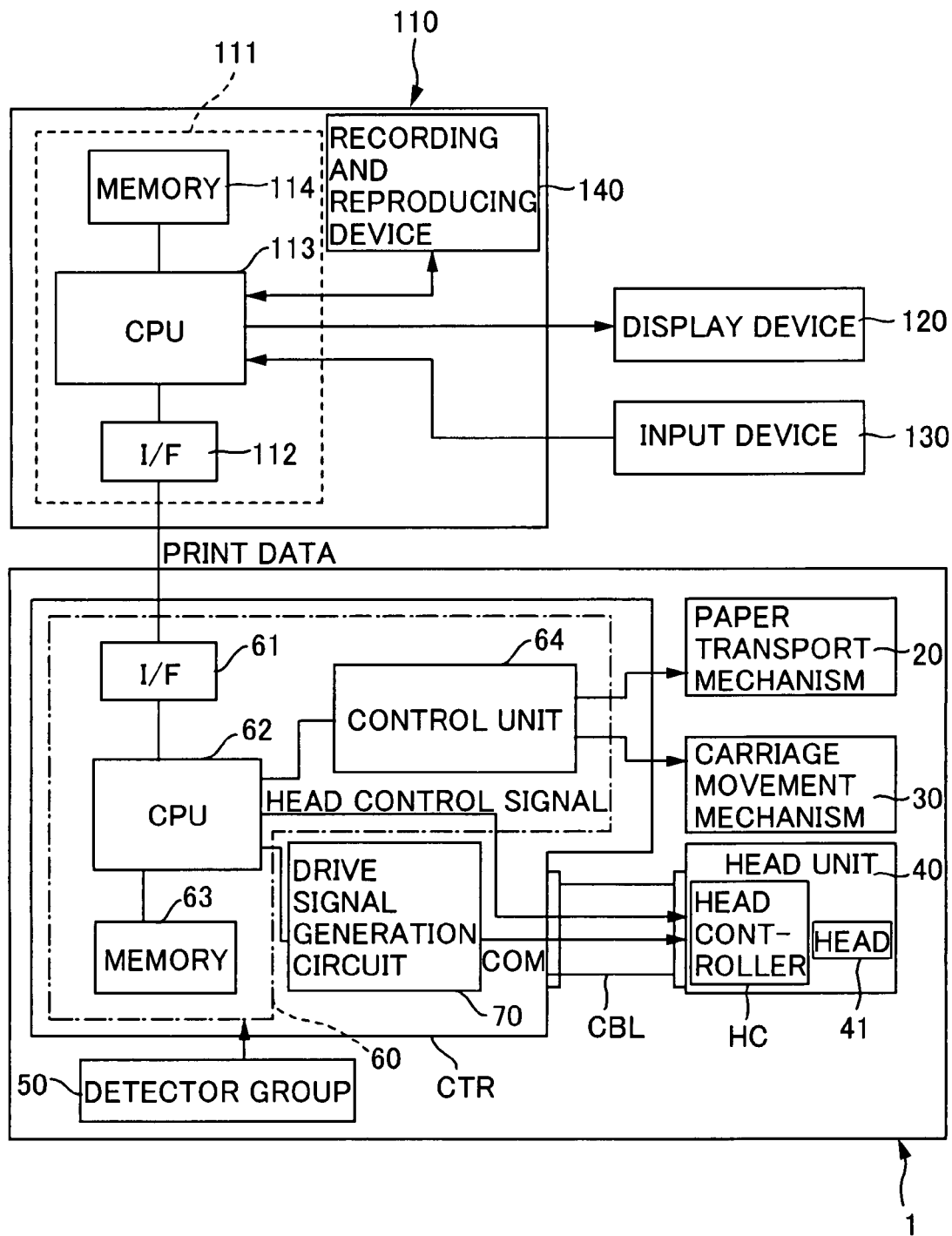
FIG. 2 is a block diagram for explaining a configuration of a computer 110 and a printer 1.

FIG. 2 is a block diagram for explaining configurations of the computer 110 and the printer 1. First, the configuration of the computer 110 is described briefly. The computer 110 has the above-mentioned recording and reproducing device 140 and a host-side controller 111. The recording and reproducing device 140 is communicably connected to the host-side controller 111 and attached to, for example, a case of the computer 110. The host-side controller 111 performs various controls in the computer 110 and is also communicably connected to the above-mentioned display device 120 and input device 130. The host-side controller 111 has an interface section 112, a CPU 113, and a memory 114. The interface section 112 is interposed between the computer 110 and the printer 1 and exchanges data with the printer 1. The CPU 113 is a computation processing device for performing overall control of the computer 110. The memory 114 is for reserving an area for storing computer programs used by the CPU 113 and a working area, for example, and is constituted by a RAM, an EEPROM, a ROM, or a magnetic disk device, for example. Examples of the computer programs that are stored in the memory 114 include the application programs and the printer driver as described above. The CPU 113 performs various controls according to the computer programs stored in the memory 114.

The printer driver allows the computer 110 to convert image data to print data and transmits the print data to the printer 1. The print data is data having a format that can be interpreted by the printer 1, and has various types of command data and pixel data. The command data is data for directing the printer 1 to execute a particular operation. Examples of the command data include command data for directing paper feed, command data for indicating the transport amount, and command data for directing paper discharge. Moreover, the pixel data is data about pixels of the image to be printed.

Here, a pixel refers to a unit element making up an image, and by arranging pixels in two dimensions, images are formed. The pixel data of the print data is data relating to dots that are formed on paper S (for example, tone values). In this embodiment, the pixel data is, for example, 2-bit data per pixel. 2-bit pixel data can express a single pixel in four tones.

Printer Driver

The printer driver receives image data from the application program, and converts the image data to print data in a format that can be interpreted by the printer 1, and outputs the print data to the printer.

Figure 3:
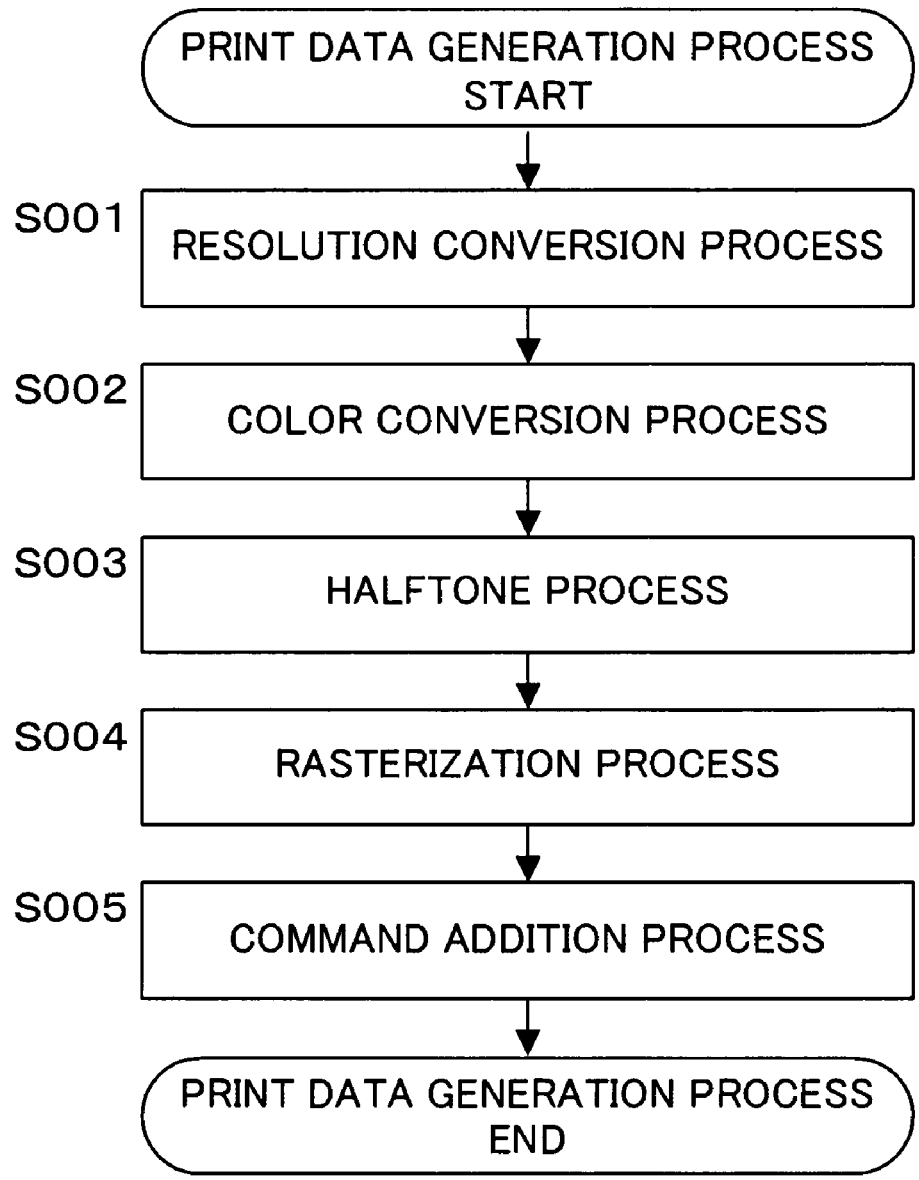
FIG. 3 is a flowchart of a process performed when a printer driver generates print data.

FIG. 3 is a flowchart of a process performed when the printer driver generates print data. The computer 110 having the printer driver installed thereon performs various processes according to the program code of the printer driver. Namely, the printer driver includes program code for performing various processes.

A resolution conversion process (S001) is a process in which image data (such as text data and image data) output from the application program is converted to image data with a resolution (print resolution) when performing printing on paper. For example, when the print resolution has been specified as 720×720 dpi, then vector image data obtained from the application program is converted to bitmap image data with a resolution of 720×720 dpi. It should be noted that after the resolution conversion process, each unit of pixel data of the image data is multi-tone RGB pixel data (such as 256 tones) that is expressed in RGB color space.

A color conversion process (S002) is a process in which the RGB pixel data is converted to CMYK pixel data that is expressed in CMYK color space. It should be noted that the CMYK pixel data is data that corresponds to the ink colors of the printer. This color conversion process is performed based on a table (color conversion lookup table LUT) in which the tone values of the RGB pixel data are associated with the tone values of the CMYK data. It should be noted that after the color conversion process, pixel data is the CMYK pixel data with 256 tones expressed in the CMYK color space.

A halftone process (S003) is a process in which data of a high number of tones is converted to data of a number of tones that can be formed by the printer. For example, by the halftone process, pixel data expressing 256 tones is converted to 1-bit data expressing two tones or 2-bit data expressing four tones. In the halftone process, dithering, ▫-correction, and error diffusion, for example, are used. Data that has undergone the halftone process has a resolution similar to the print resolution (such as 720×720 dpi). In the image data after the halftone process, 1-bit or 2-bit pixel data corresponds to each pixel, and this pixel data is data indicating a dot forming status (presence/absence of a dot, and the size of a dot) for each pixel. It should be noted that details of the halftone process are discussed later.

A rasterization process (S004) is a process in which pixel data arranged in a matrix is rearranged following the dot formation order during printing. For example, if a dot forming process is performed in several processes during printing, then pixel data corresponding to each dot forming process is extracted, and rearranged following the order of the dot forming process. It should be noted that if print modes are different, then the dot formation orders during printing are different. Thus, the rasterization process is performed in accordance with the print mode.

A command addition process (S005) is a process in which command data according to the print mode is added to data that has undergone the rasterization process. Examples of command data include transport data indicating the transport amount.

Print data that has been generated through these processes is transmitted by the printer driver to the printer.

Printer

Regarding the Configuration of the Printer 1

Figure 4:
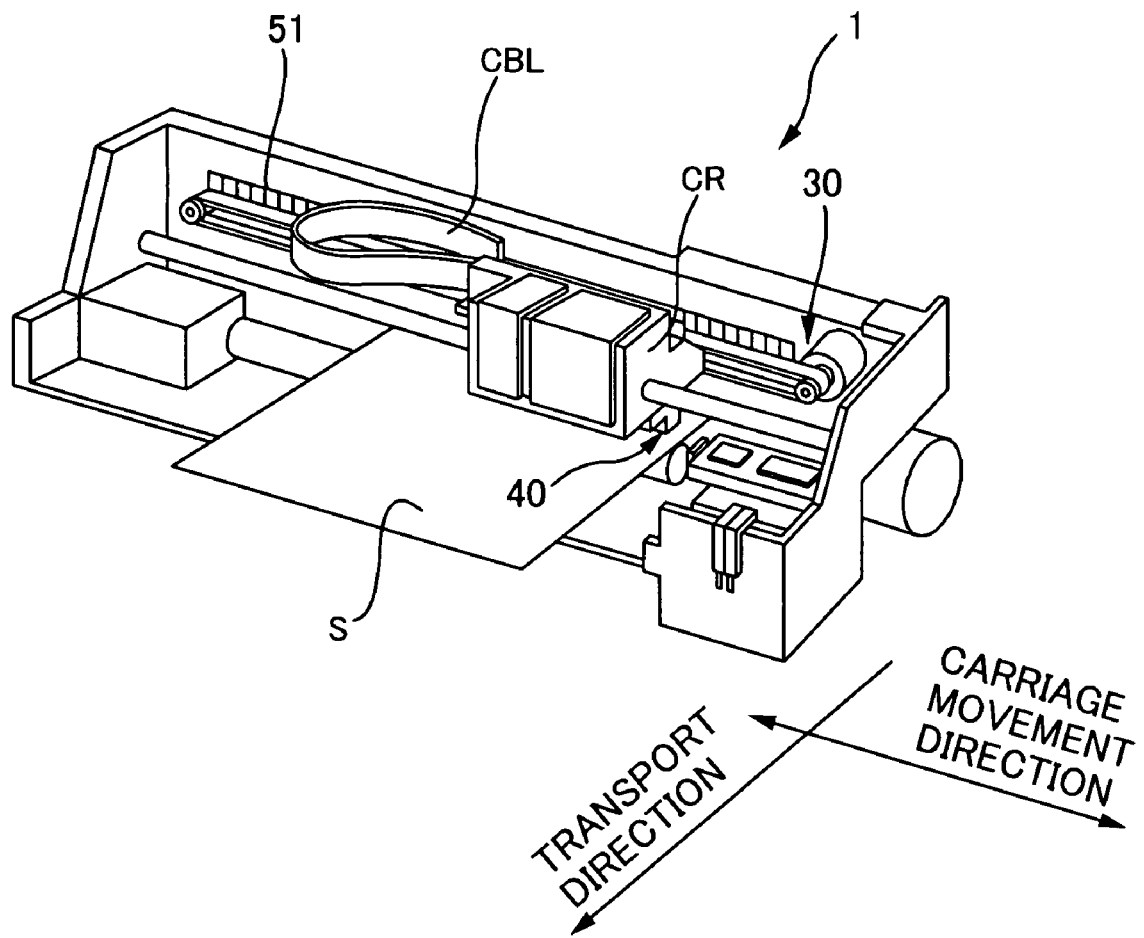
FIG. 4 is a diagram showing the configuration of the printer 1 of the present embodiment.

FIG. 4 is a diagram showing the configuration of the printer 1 of the present embodiment. In the following description, reference also is made to FIG. 2.

The printer 1 includes a paper transport mechanism 20, a carriage movement mechanism 30, a head unit 40, a detector group 50, a printer-side controller 60, and a drive signal generation circuit 70. The printer-side controller 60 and the drive signal generation circuit 70 are provided on a common controller board CTR. Moreover, the head unit 40 has a head controller HC and a head 41.

In the printer 1, the printer-side controller 60 controls the sections to be controlled, i.e., the paper transport mechanism 20, the carriage movement mechanism 30, the head unit 40 (head controller HC, head 41), and the drive signal generation circuit 70. Thus, based on the print data received from the computer 110, the printer-side controller 60 causes images to be printed on the paper S. Moreover, detectors in the detector group 50 monitor the conditions in the printer 1. The detectors output detection results to the printer-side controller 60. The printer-side controller 60 that has received the detection results from the detectors controls the sections to be controlled based on the detection results.

The paper transport mechanism 20 is for transporting media in the transport direction. The paper transport mechanism 20 feeds the paper S up to a printable position, and also transports the paper S in the transport direction by a predetermined transport amount. The transport direction is a direction that intersects a carriage movement direction.

The carriage movement mechanism 30 is for moving a carriage CR to which the head unit 40 is attached in the carriage movement direction. The carriage movement direction includes a movement direction from one side to the other side and a movement direction from the other side to the one side. It should be noted that since the head unit 40 has the head 41, the carriage movement direction corresponds to the movement direction of the head 41, and the carriage movement mechanism 30 moves the head 41 in the movement direction.

The head unit 40 is for ejecting ink toward the paper S. The head unit 40 is attached to the carriage CR. The head 41 of the head unit 40 is provided on the lower surface of a head case. Moreover, the head controller HC of the head unit 40 is provided inside the head case. The head controller HC is described in greater detail later.

The detector group 50 is for monitoring the status of the printer 1. The detector group 50 includes, among others, a linear encoder 51 for detecting the position of the carriage CR in the movement direction. Additionally, the detector group 50 also includes a sensor for detecting the transport amount of the paper (such as an encoder that detects the amount of rotation of a transport roller for transporting the paper) or the like.

The printer-side controller 60 performs control of the printer 1. The printer-side controller 60 has an interface section 61, a CPU 62, a memory 63, and a control unit 64. The interface section 61 exchanges data with the computer 110, which is an external apparatus. The CPU 62 is a computation processing device for performing overall control of the printer 1. The memory 63 is for reserving an area for storing programs for the CPU 62 and a working area, for example, and is constituted by a storage device such as a RAM, an EEPROM, or a ROM. The CPU 62 controls the sections to be controlled according to the computer programs stored in the memory 63. For example, the CPU 62 controls the paper transport mechanism 20 and the carriage movement mechanism 30 via the control unit 64. Moreover, the CPU 62 outputs head control signals for controlling the operation of the head 41 to the head controller HC and outputs generation signals for generating drive signals COM to the drive signal generation circuit 70. During printing, the printer-side controller 60 alternately repeats a dot formation operation of ejecting ink from the head 41 while moving the carriage CR so as to form dots on paper, and a transporting operation of causing the paper transport mechanism 20 to transport the paper, thereby printing an image on the paper.

The drive signal generation circuit 70 generates drive signals COM. It should be noted the drive signal COM generated by the drive signal generation circuit 70 is described later.

A cable CBL is provided between the controller board CTR and the carriage CR. Head control signals and drive signals COM are transmitted from the controller board CTR side to the head unit 40 side via the cable CBL.

Regarding the Configuration of the Head 41

Figure 5:
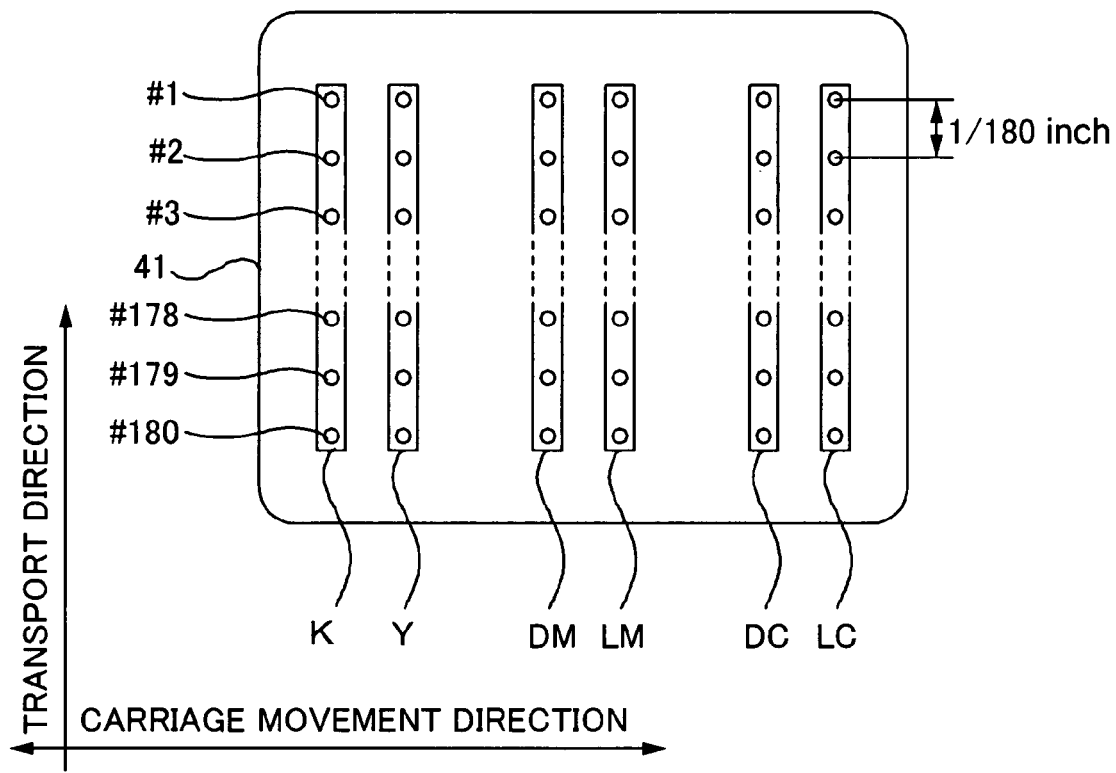
FIG. 5 is an explanatory diagram of nozzles provided in a head 41 of a printer capable of printing in six colors.

FIG. 5 is an explanatory diagram of nozzles provided in the head 41 of the printer capable of printing in six colors. In the lower surface of the head 41, a black ink nozzle group K, a yellow ink nozzle group Y, a dark magenta ink nozzle group DM, a light magenta ink nozzle group LM, a dark cyan ink nozzle group DC, a light cyan ink nozzle group LC are formed. Each nozzle group is provided with 180 nozzles that are ejection openings for ejecting ink of the corresponding color. Each nozzle is provided with an ink chamber (not shown) and a piezo element. Driving the piezo element causes the ink chamber to expand and contract, thereby ejecting an ink droplet from the nozzle. From the each nozzle it is possible to eject a plurality of types of ink in differing amounts. Thus, dots of different sizes can be formed on the paper.

It should be noted that the density of the light cyan ink is lower than that of the dark cyan ink. Cyan has the property of absorbing red light, its complementary color, and light cyan dots that are formed with light cyan ink (light dots) absorb less red light than the dots that are formed with dark cyan ink (dark dots). The density of the light magenta ink is lower than that of the dark magenta ink. Magenta has the property of absorbing green light, its complementary color, and dots that are formed with light magenta ink (light dots) absorb less green light than the dots that are formed with dark magenta ink (dark dots).

Configuration of the Head Controller HC and Various Signals

Figure 6:
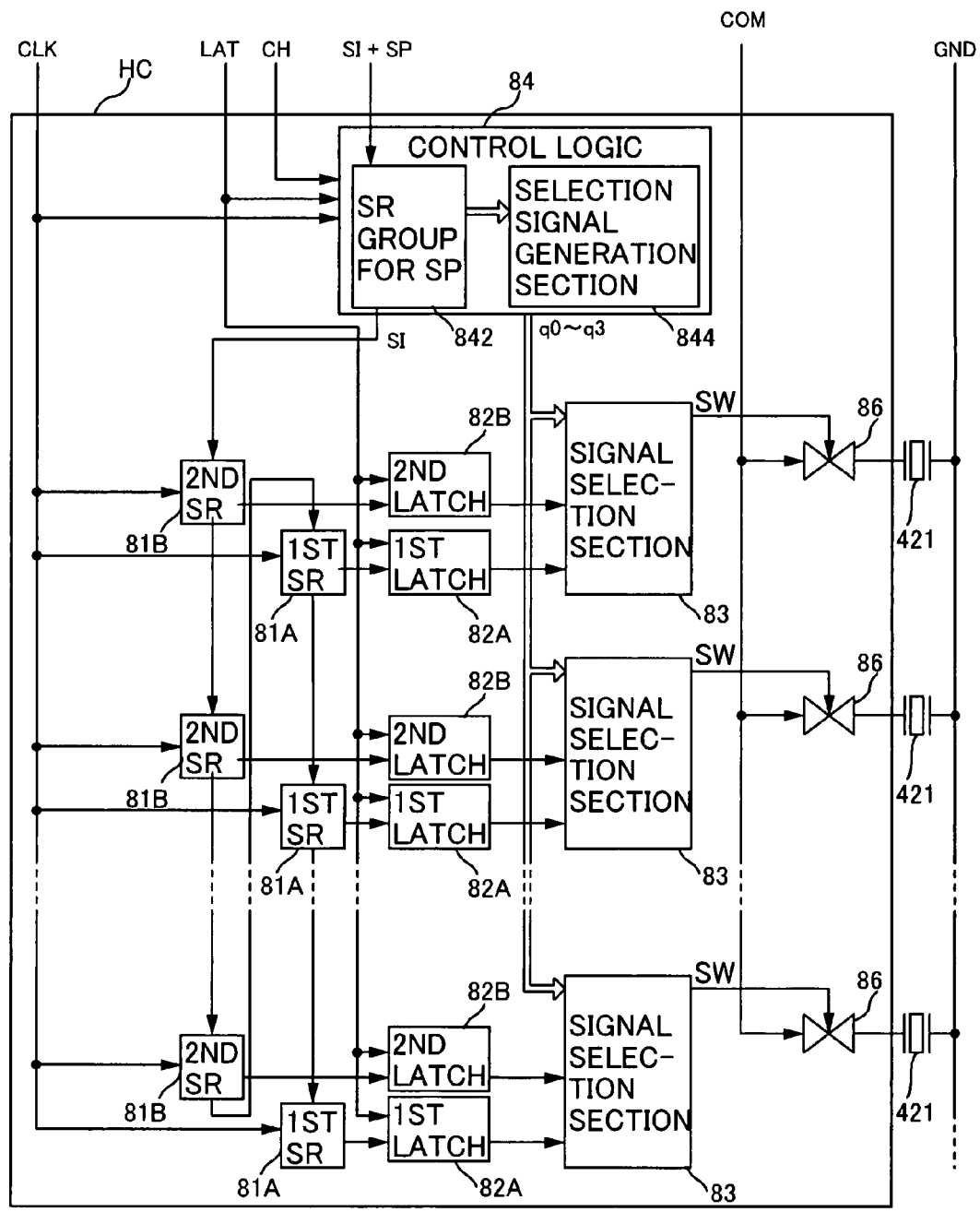
FIG. 6 is a block diagram of a head controller HC.

FIG. 6 is a block diagram of the head controller HC.

The head controller HC is provided with a first shift register 81A, a second shift register 81B, a first latch circuit 82A, a second latch circuit 82B, a signal selection section 83, a control logic 84, and a switch 86. Each one of the sections aside from the control logic 84 (that is, the first shift register 81A, the second shift register 81B, the first latch circuit 82A, the second latch circuit 82B, the signal selection section 83, and the switch 86) is provided for each piezo element 421. The control logic 84 has a shift register group 842 for storing setting data SP, and a selection signal generation section 844 that generates selection signals q0 to q3 based on the selection data SP.

A clock CLK, a latch signal LAT, a change signal CH, and the drive signal COM are input from the printer-side controller 60 to the head controller HC via the cable CBL. A transmission signal TR that contains transmission data TRD made up of pixel data SI and the setting data SP also is input to the head controller HC from the printer-side controller 60 via the cable CBL.

Figure 7:
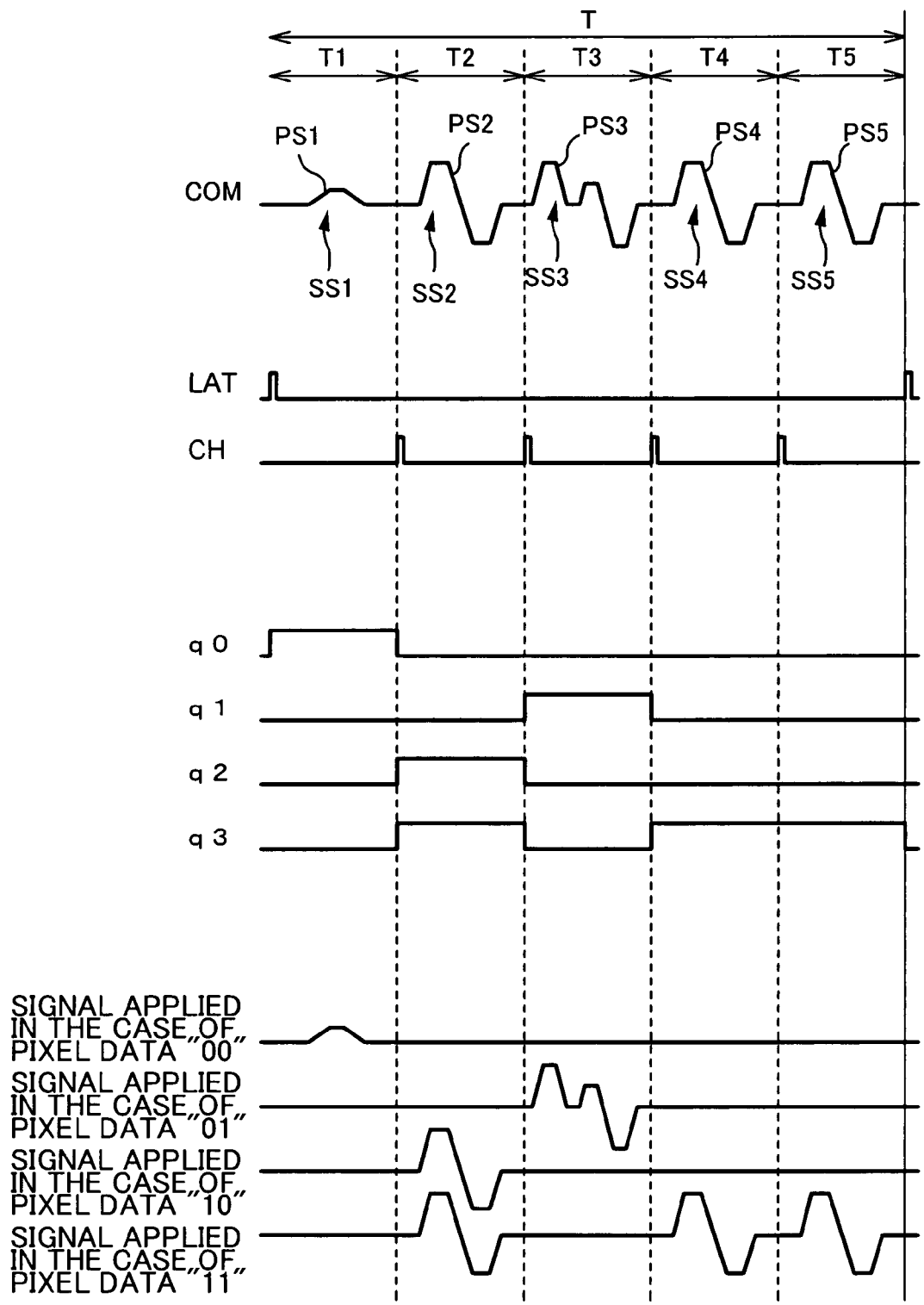
FIG. 7 is an explanatory diagram of various signals.

FIG. 7 is an explanatory diagram of various signals.

The drive signal COM is repeatedly generated each repeating period T. The repeating period T is time required for the carriage CR to move a predetermined distance. Thus, each time that the carriage CR moves a predetermined distance, the drive signal COM with a fixed waveform is repeatedly generated by the drive signal generation circuit 70. Each repeating period T can be divided into five intervals T1 to T5. A first interval signal SS1 that includes a drive pulse PS1 is generated in the first interval T1, a second interval signal SS2 that includes a drive pulse PS2 is generated in the second interval T2, a third interval signal SS3 that includes a drive pulse PS3 is generated in the third interval T3, a fourth interval signal SS4 that includes a drive pulse PS4 is generated in the fourth interval T4, and a fifth interval signal SS5 that includes a drive pulse PS5 is generated in the fifth interval T5. It should be noted that the waveforms of the drive pulses PS1 to PS5 are determined based on the operation that the piezo element 421 is to perform.

The latch signal LAT is a signal for defining the repeating period T. The pulse signal of the latch signal LAT is output each time that the carriage CR moves a predetermined distance. The change signal CH is for dividing the repeating period T into five intervals T1 to T5.

The selection signals q0 to q3 are signals output from the selection signal generation section 844. The selection signal generation section 844 determines the L level or H level of the selection signals for the five intervals T1 to T5 based on the setting data SP, and outputs the same.

An applied signal is a signal applied to the piezo element 421. The applied signals vary depending on the content of the pixel data corresponding to each piezo element 421.

Next, the operation performed by the head controller HC to cause the applied signal to be applied to the piezo element 421 is described.

When the setting data SP and the pixel data SI are received by the head controller HC in synchronization with the clock CLK (not shown in FIG. 7), the lower order bit data of the pixel data, which is 2-bit data, is stored in the first shift registers 81A, the upper order bit data is stored in the second shift registers 81B, and the setting data SP is stored in the shift register group 842 of the control logic 84. In correspondence with the pulse of the latch signal LAT, the lower order bit data is latched in the first latch circuits 82A, the upper order bit data is latched in the second latch circuits 82B, and the setting data SP is latched in the selection signal generation section 844.

The signal selection section 83 selects one of the selection signals q0 to q3 according to the 2-bit pixel data that has been latched by the first latch circuit 82A and the second latch circuit 82B. The selection signal q0 is selected if the pixel data is "00" (the lower order bit is "0" and the upper order bit is "0"), the selection signal q1 is selected if the pixel data is "01", the selection signal q2 is selected if the pixel data is "10", and the selection signal q3 is selected if the pixel data is "11". The selection signal that is selected is output from the signal selection section 83 as a switch signal SW.

The drive signal COM and the switch signal SW are input to the switch 86. When the switch signal is H level, the switch 86 becomes on and the drive signal COM is applied to the piezo element 421. When the switch signal SW is L level, the switch 86 becomes off and the drive signal COM is not applied to the piezo element 421.

When the pixel data is "00", the switch 86 is switched on or off by the selection signal q0, and the first interval signal SS1 of the drive signal COM is applied to the piezo element 421 and the piezo element 421 is driven by the drive pulse PS1. When the piezo element 421 is driven according to the drive pulse PS1, a change in pressure occurs to ink with such a degree that does not result in the ejection of ink, and the ink meniscus (the free surface of the ink that is exposed at the nozzle portion) is finely vibrated.

When the pixel data is "01", the switch 86 is switched on or off by the selection signal q1, and the third interval signal SS3 of the drive signal COM is applied to the piezo element 421 and the piezo element 421 is driven by the drive pulse PS3. When the piezo element 421 is driven according to the drive pulse PS3, a small ink droplet of 2.5 pl is ejected and forms a small dot on the paper.

When the pixel data is "10", the switch 86 is switched on or off by the selection signal q2, and the second interval signal SS2 of the drive signal COM is applied to the piezo element 421 and the piezo element 421 is driven by the drive pulse PS2. When the piezo element 421 is driven according to the drive pulse PS2, a medium ink droplet of 7 pl is ejected and forms a medium dot on the paper.

When the pixel data is "11", the switch 86 is switched on or off by the selection signal q3, and the second interval signal SS2, the fourth interval signal SS4 and the fifth interval signal SS5 of the drive signal COM are applied to the piezo element 421 and the piezo element 421 is driven by the drive pulse PS2, the drive pulse PS4 and the drive pulse PS5. When the piezo element 421 is driven according to the drive pulses PS2, PS4 and PS5, a large ink droplet of 21 pl is ejected and a large dot is formed on the paper.

Halftone Process

First, the halftone process for black and yellow is described. Then, the halftone process for cyan and magenta, which involves light ink and dark ink, is described.

Halftone Process for Black and Yellow

Figure 8:
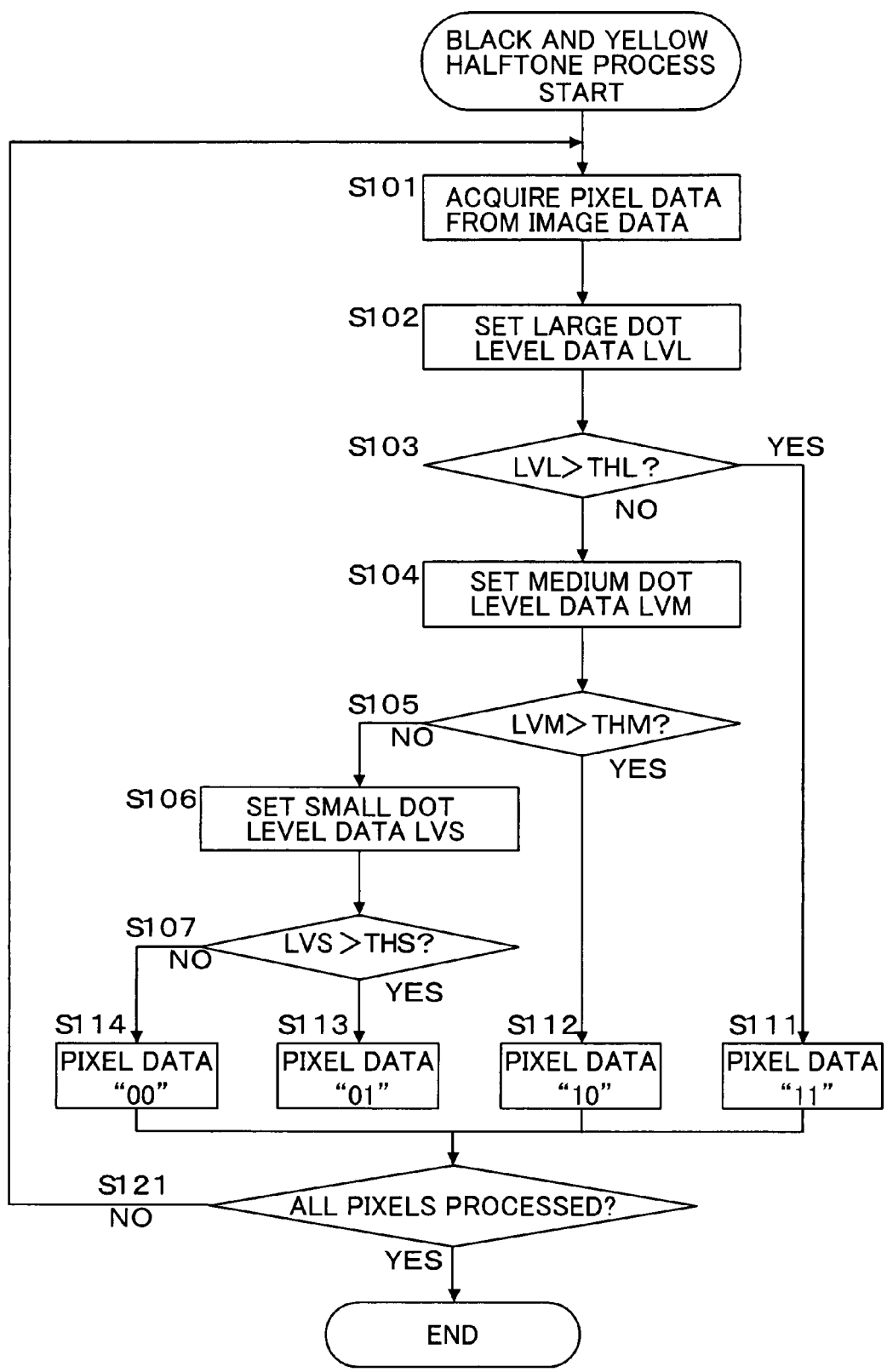
FIG. 8 is a flowchart of a halftone process for black and yellow.

FIG. 8 is a flowchart of the halftone process for black and yellow. The computer 110 on which the printer driver is installed performs various processes according to the program code of the printer driver. Namely, the printer driver includes program code for performing various processes.

The pixel data of image data before being subjected to the halftone process (image data after being subjected to the color conversion process) is CMYK pixel data in 256 tones expressed in the CMYK color space.

This CMYK pixel data is composed of 8-bit C pixel data indicating cyan tone, 8-bit M pixel data indicating magenta tone, 8-bit Y pixel data indicating yellow tone, and 8-bit K pixel data indicating black tone. The image data is composed of a set of such pixel data. C image data that indicates a cyan image is composed of a set of C pixel data, M image data that indicates a magenta image is composed of a set of M pixel data, Y image data that indicates a yellow image is composed of a set of Y pixel data, and K image data that indicates a black image is composed of a set of K pixel data.

In the halftone process for black and yellow, the printer driver converts 8-bit pixel data to 2-bit pixel data. The 2-bit pixel data serves as data indicating "no dot", "small dot", "medium dot" and "large dot" with respect to the pixel corresponding to that pixel data.

First, the printer driver acquires pixel data from the CMYK image data (S101). Here, the halftone process of K image data indicating a black image is described. Pieces of 8-bit K pixel data configuring the K image data are extracted in order.

Figure 9:
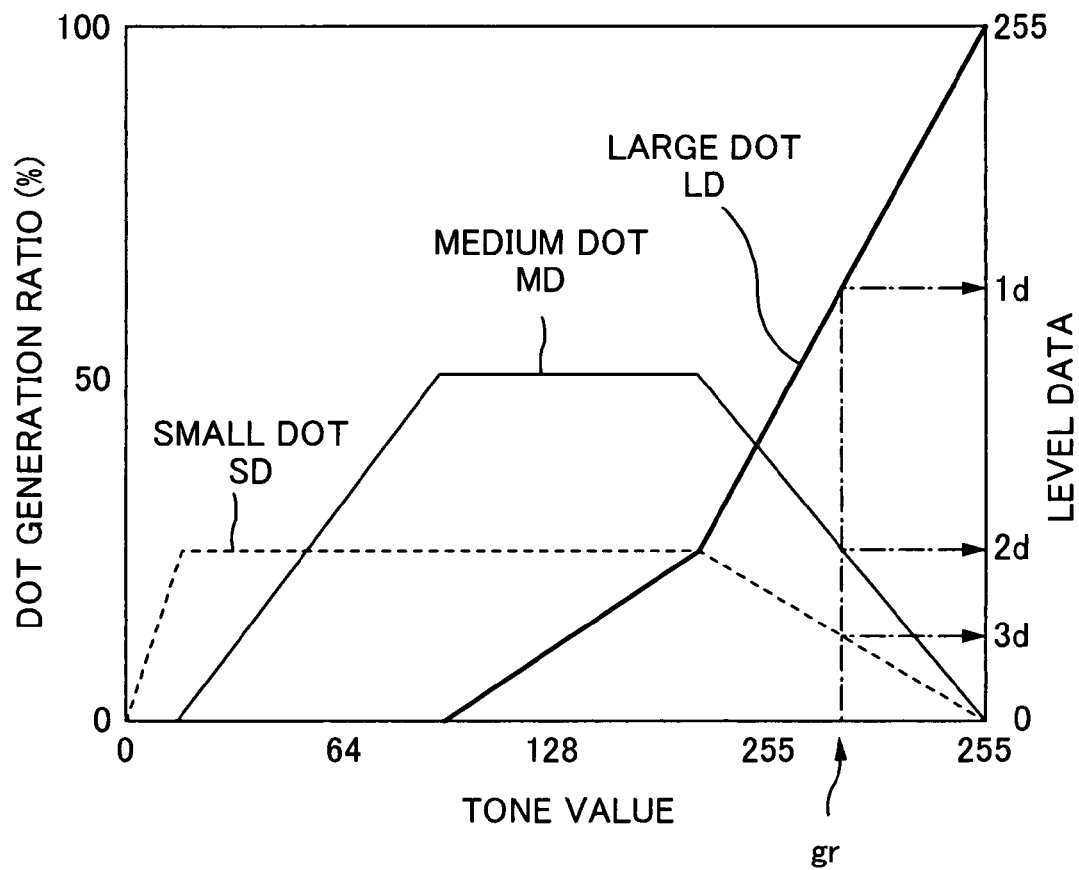
FIG. 9 is an explanatory diagram of a dot generation ratio table.

FIG. 9 is an explanatory diagram of a dot generation ratio table. The horizontal axis of the graph indicates the tone value (0 to 255), and the vertical axis on the left side indicates the dot generation ratio (0 to 100%) and that on the right side indicates the level data.

"Dot generation ratio" used herein means, when a uniform region is expressed according to a certain fixed tone value, a ratio of pixels for which dots are formed to all the pixels in that region. For example, when all the pixel data in a region constituted by 16×16 pixels has a certain fixed tone value, if "n" dots are formed with respect to those 16×16 pixels, the dot generation ratio for that tone value is expressed as {n/(16× 16)}×100 (%). The profile SD shown by the dotted line in FIG. 9 indicates the small dot generation ratio, the profile MD shown by the thin line indicates the medium dot generation ratio, and the profile LD shown by the thick line indicates the large dot generation ratio. In addition, "level data" refers to data that expresses the dot generation ratio in 256 levels with one of values from 0 to 255.

The printer driver sets large dot level data LVL according to the tone value of the extracted K pixel data (S102). For example, if the tone value of the K pixel data is "gr", the large dot level data LVL is set to "1d" based on the profile LD.

Next, the printer driver judges whether or not the large dot level data LVL exceeds a threshold value THL (S103). The different threshold values THL are set for the pixels in the dither matrix. In the present embodiment, a matrix is used in which a value from 0 to 255 is indicated in each of 16×16 square pixel blocks.

Figure 10:
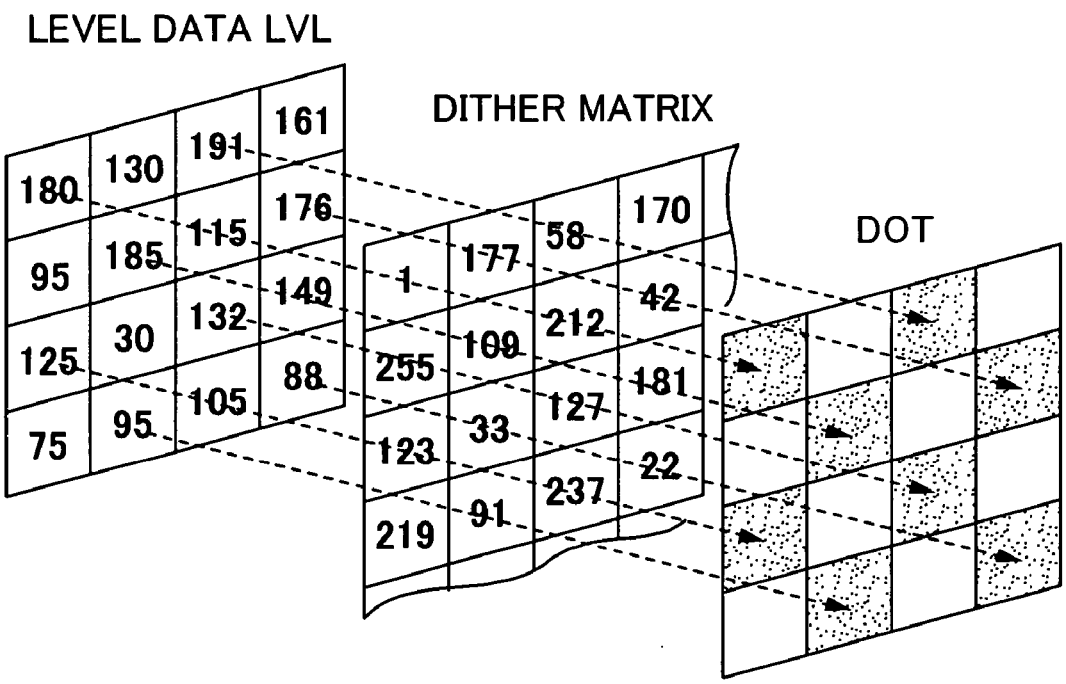
FIG. 10 is a diagram showing how dots are to be judged to be on or off according to dithering.

FIG. 10 is a diagram showing how dots are to be judged to be on or off according to dithering. For the sake of indication by drawing, only 4×4 pixel blocks are shown.

For example, assume that the large dot level data LVL is set to "180" with respect to the upper left pixel in FIG. 10. The threshold value THL in the dither matrix corresponding to the pixel is "1". The printer driver then compares the threshold value THL "1" with the large dot level data LVL "180". In this case, the large dot level data LVL is judged to be larger than the threshold value THL. With respect to the pixel on the right side of the pixel, it is judged that the large dot level data LVL "130" does not exceed the threshold value THL "177".

When the printer driver judges that the large dot level data LVL is larger than the threshold value THL ("Yes" in S103), it converts pixel data of the corresponding pixel to "11" (S111) and terminates the process for that pixel data.

On the other hand, when the printer driver judges that the large dot level data LVL is equal to or smaller than the threshold value THL ("No" in S103), it sets medium dot level data LVM (S104). For example, if the tone value of the K pixel data is "gr", the medium dot level data LVM is set to "2d" based on the profile MD. Similar to the case of the large dot level data LVL, when the printer driver judges that the medium dot level data LVM is larger than a threshold value THM ("Yes" in S105), it converts data of the corresponding pixel to "10" (S112) and terminates the process for that pixel data.

In addition, when the printer driver judges that the medium dot level data LVM is equal to or smaller than the threshold value THM ("No" in S105), it sets small dot level data LVS (S106). For example, if the tone value of the K pixel data is "gr", the small dot level data LVS is set to "3d" based on the profile SD. Similar to the case of the large dot level data LVL, when the printer driver judges that the small dot level data LVS is larger than a threshold value THS ("Yes" in S107), it converts pixel data of the corresponding pixel to "01" (S113) and terminates the process for that pixel data.

When the printer driver judges that the small dot level data LVS is equal to or smaller than the threshold value THS ("No" in S107), it converts pixel data of the corresponding pixel to "00"(S114) and terminates the process for that pixel data.

Figure 11A:
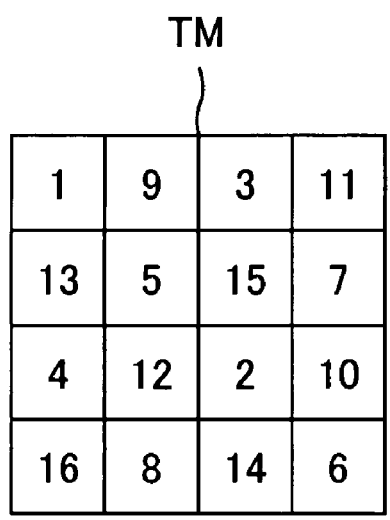
FIG. 11 is a diagram showing a relationship between a dither matrix used for judgment of large dots, and a dither matrix used for judgment of medium dots.
Figure 11B:
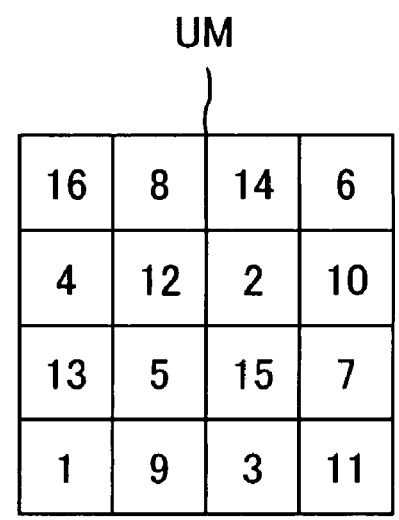

FIG. 11 is a diagram showing a relationship between the dither matrix used for judgment of large dots, and the dither matrix used for judgment of medium dots. While the 16×16 matrix is used in the present embodiment, as described above, for the sake of indication by drawing, the 4×4 matrix is shown. It is understood by comparing the two matrixes that their respective rows of threshold values are arranged in reverse order. If the same dither matrix is used for the large dot and the medium dot, pixel blocks for which dots are likely to be judged to be on coincide for both dots. That is, it is probable that when the large dot is judged to be off, the medium dot is judged to be off as well. As a result, the generation ratio of the middle dot may be lower than a desired generation ratio. In order to avoid such a situation, in the present embodiment different dither matrixes are used for the large and medium dots. In other words, by changing pixel blocks that tend to be judged to be on for the large dot and the medium dot, an appropriate generation ratio is secured for both dots.

After converting the pixel data to 2-bit data (S111 to S114), the printer driver judges whether or not conversion of all the pixel data of the K image data is completed (S121). If it is not completed ("No" in S121), a similar process is performed for unprocessed K pixel data (S101 to S121). If all pixel data has been converted ("Yes" in S121), the halftone process for the K image data is terminated. The printer driver performs a process similar to that performed on the K image data also on the Yellow image data.

Halftone Process for Cyan and Magenta (Reference Example)

Next, the halftone process for cyan and magenta is described. Since the halftone process for cyan and magenta involves light ink and dark ink, it is different from the halftone process for black and yellow.

In the halftone process for cyan and magenta, the printer driver converts 8-bit pixel data to 2-bit pixel data for light ink and 2-bit pixel data for dark ink. 2-bit pixel data for light ink serves as data indicating "no dot", "small dot", "medium dot" and "large dot" in light ink with respect to the pixel corresponding to that pixel data. Also, 2-bit pixel data for dark ink serves as data indicating "no dot", "small dot", "medium dot" and "large dot" in dark ink with respect to the pixel corresponding to that pixel data.

Figure 12:
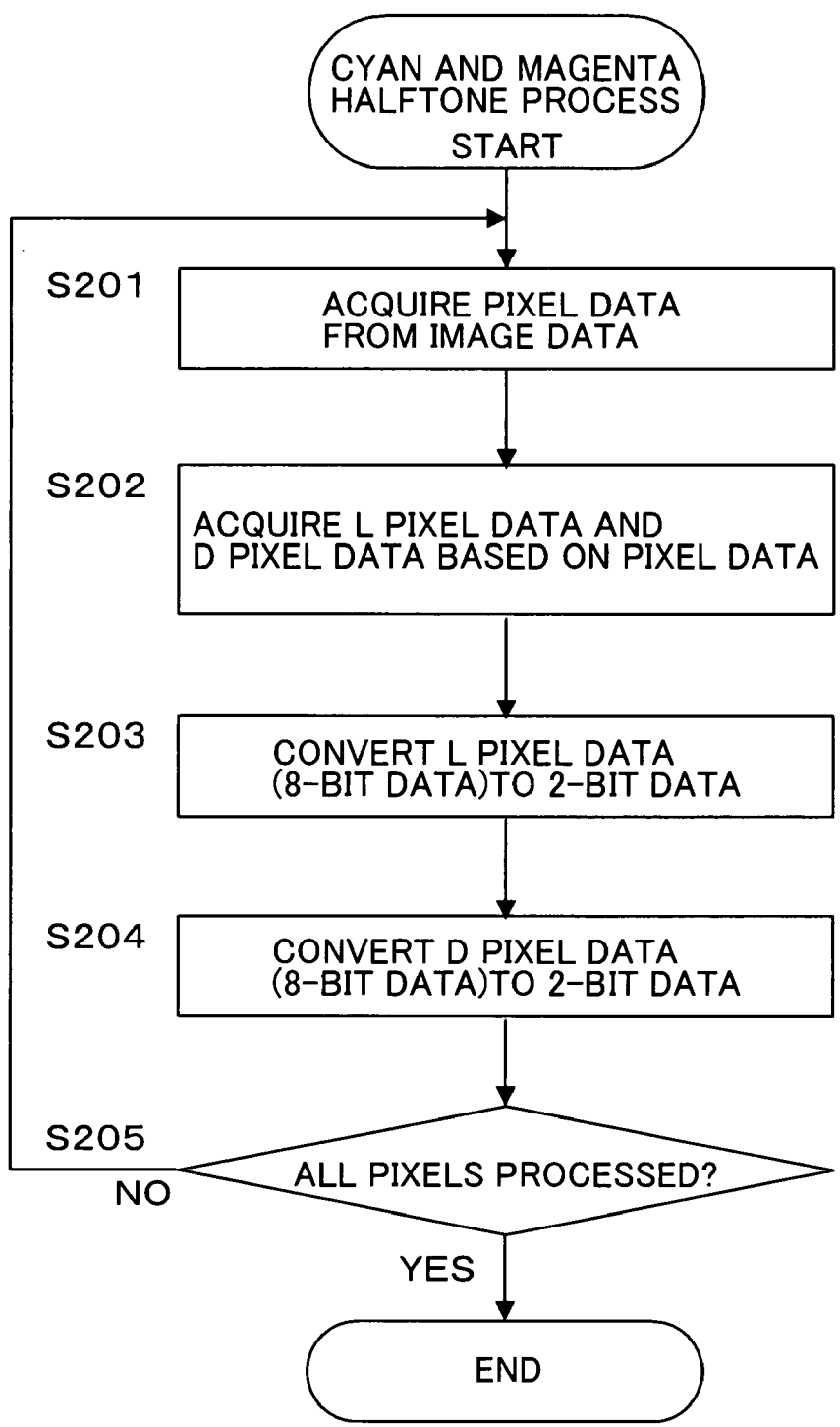
FIG. 12 is a flowchart of a halftone process for cyan and magenta.

FIG. 12 is a flowchart of the halftone process for cyan and magenta. The computer 110 on which the printer driver is installed performs various processes according to the program code of the printer driver. Namely, the printer driver includes program code for performing various processes.

First, the printer driver acquires pixel data from the CMYK image data (S201). Here, the halftone process of C image data indicating a cyan image is described. Pieces of 8-bit C pixel data constituting the C image data are extracted in order.

Next, the printer driver refers to a tone value conversion table and acquires LC pixel data indicating the light cyan tone and DC pixel data indicating the dark cyan tone based on the C pixel data indicating the cyan tone (S202).

Then, the printer driver converts 8-bit LC pixel data for light cyan to 2-bit LC pixel data (S203). The process of converting 8-bit pixel data to 2-bit pixel data is similar to the process of converting 8-bit K pixel data to 2-bit pixel data of black described above. (However, the dot generation ratio table differs between the reference example and the present embodiment.)

Next, the printer driver converts 8-bit DC pixel data for dark cyan to 2-bit DC pixel data (S204). The process of converting 8-bit pixel data to 2-bit pixel data is similar to the process of converting 8-bit K pixel data to 2-bit pixel data of black described above.

After converting C pixel data to 2-bit LC pixel data for light cyan and 2-bit DC pixel data for dark cyan, the printer driver judges whether or not conversion of all the pixel data of the C image data is completed (S205). If it is not completed ("No" in S205), a similar process is performed for unprocessed C pixel data (S201 to S205). If all C pixel data has been converted ("Yes" in S205), the halftone process for the C image data is terminated. The printer driver performs a process similar to that performed on the C image data also on M image data.

Halftone Process of the Comparative Example

Tone Value Conversion Table of the Comparative Example

Figure 13A:
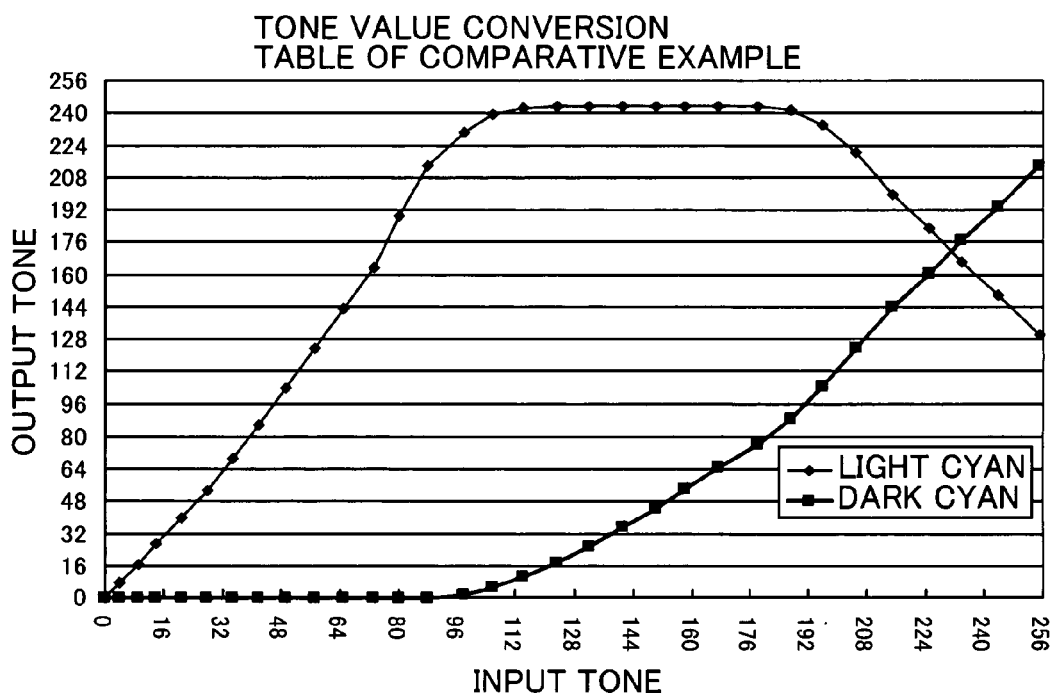
FIG. 13A is an explanatory diagram of a tone value conversion table of a comparative example.

FIG. 13A is an explanatory diagram of a tone value conversion table of a comparative example. The horizontal axis indicates the input tone value (0 to 255) and the vertical axis indicates the output tone value (0 to 255). In FIG. 13A the thin line indicates the profile of light cyan and the thick line indicates the profile of dark cyan.

When the above-described process in S202 is performed, if, for example, the tone value of cyan (the input tone of the horizontal axis, C pixel data) is "128", the printer driver refers to the tone value conversion table and acquires the tone value of light cyan (the output tone of the vertical axis, LC pixel data), which is "243", and acquires the tone value of dark cyan (the output tone of the vertical axis, DC pixel data), which is "22".

In this manner, the printer driver converts the tone value of cyan to the tone values of light cyan and dark cyan.

Dot Generation Ratio Table of the Comparative Example

Figure 14:
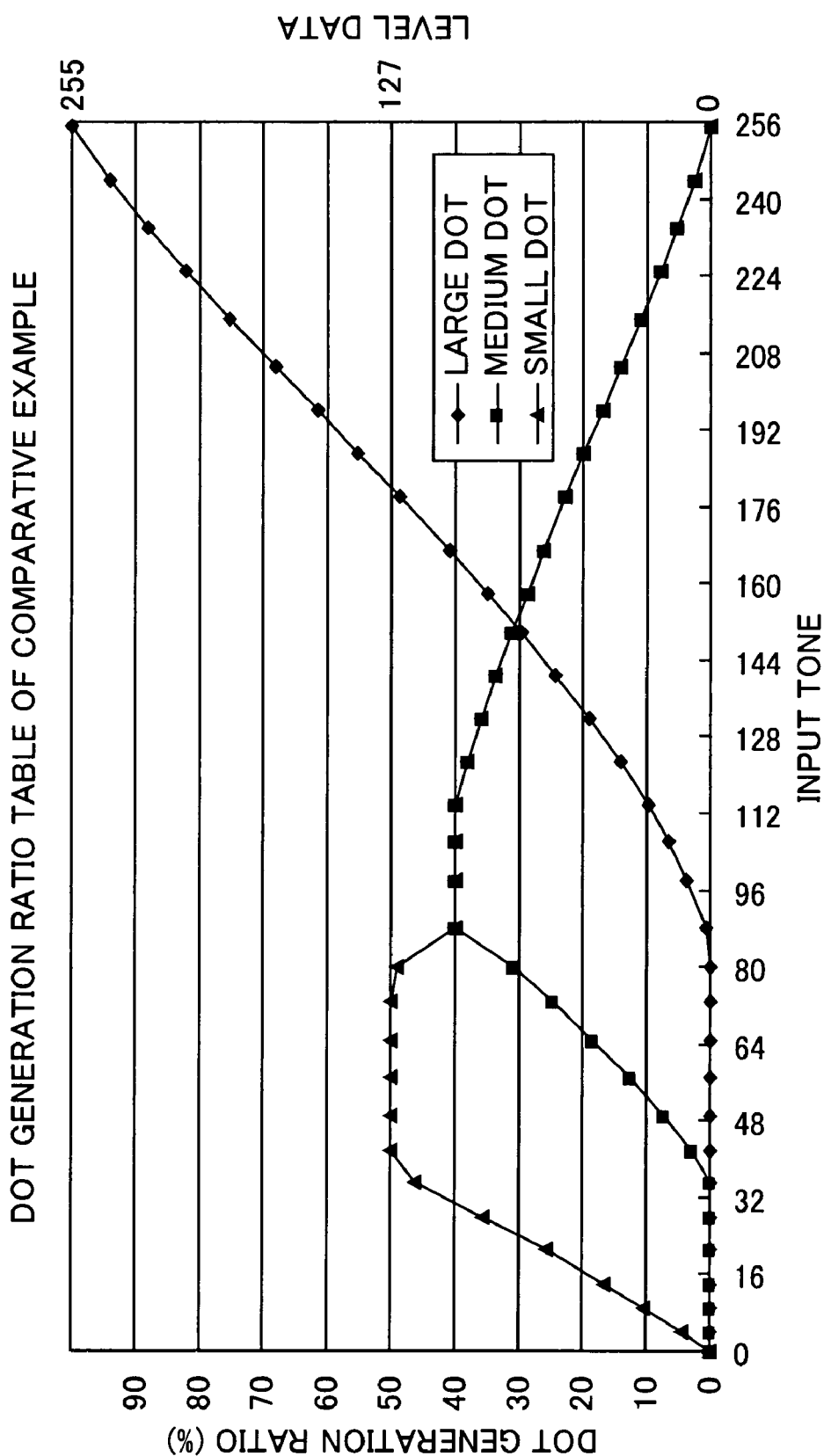
FIG. 14 is an explanatory diagram of a dot generation ratio table of the comparative example.

FIG. 14 is an explanatory diagram of a dot generation ratio table of the comparative example. In the graph, the horizontal axis indicates the tone value (0 to 255), and the left vertical axis indicates the dot generation ratio (0 to 100%) and the right vertical axis indicates the level data.

In the comparative example, a common dot generation ratio table is used for light cyan and dark cyan. That is, when the above-described processes in S203 and S204 are performed, the printer driver uses the dot generation ratio table shown in FIG. 14 to convert 8-bit LC pixel data (light cyan tone value in 256 tones) to 2-bit pixel data, and uses the same dot generation ratio table to convert 8-bit DC pixel data (dark cyan tone value in 256 tones) to 2-bit pixel data.

Incidentally, a small ink droplet (2.5 pl) for forming a small dot contains a lesser amount of ink than ink droplets for forming other dots (7 pl or 21 pl). For this reason, a small ink droplet has a large surface area with respect to its ink amount, and thus is subject to greater air resistance compared with other ink droplets. Consequently, the flight path of the small ink droplet deviates during flight so that the landing position thereof is shifted, which invites a shift in the formation position of small dots. This shift in the position of small dots deteriorates image quality (for example, resulting in scabrous image).

In particular, since the dark cyan ink has a higher density than the light cyan ink, a shift in the landing position thereof deteriorates the image quality to a greater degree. If the appearance ratio of small dots increases, many dots are formed shifted from their original formation positions, which deteriorates image quality. Therefore, the dot generation ratio table is set in advance such that the generation ratio of small dots in dark cyan ink does not exceed a predetermined dot generation ratio. In this case, the dot generation ratio table is set such that the generation ratio of small dots in dark cyan ink does not exceed 50%.

However, in the comparative example, since the common dot generation ratio table is used for dark cyan and light cyan, when the dot generation ratio table is set such that the generation ratio of small dot in dark cyan ink does not exceed 50%, it is set such that the generation ratio of small dot in light cyan ink does not exceed 50% as well. However, it should be noted that even if the position of small dots in light cyan ink is shifted, the effect to the image quality is considered to be smaller than the case of dark cyan ink due to low ink density.

On the other hand, when the dot generation ratio table is set such that the generation ratio of small dots in light cyan ink does not exceed 50%, it is required to start generating medium dots at a comparatively low tone value indicated by the LC pixel data (light cyan tone value). In this case, the generation of medium dots in light cyan ink is started at a light cyan tone value of "42".

However, if the generation of medium dots is started at a low tone value, the ink amount that lands on paper increases.

Also, if the generation ratio of light cyan dots is set to a low value, it is required to start generating dark cyan dots at a comparatively low cyan tone value. According to FIG. 13A, the tone value of dark cyan (the output tone of the vertical axis, DC pixel data) is "0" while the cyan tone value (the input tone of the horizontal axis) is equal to or smaller than "88". When the cyan tone value exceeds "88", the dark cyan tone value becomes greater than "0", and the generation of dark cyan dot is started.

However, if the generation of dark cyan dots is started at a comparatively low cyan tone value, dots formed in dark cyan ink appear in an image having a comparatively faint tone. Consequently the dots in dark cyan ink become highly noticeable, which results in an image with unfavorable graininess.

Halftone Process of the Present Embodiment

In the present embodiment, as described below, the dot generation ratio table for light cyan and the dot generation ratio table for dark cyan are separately provided. The maximum value of the small dot generation ratio in the light cyan dot generation ratio table is set higher than the maximum value of the small dot generation ratio in the dark cyan dot generation ratio table.

Tone Value Conversion Table of the Present Embodiment

Figure 13B:
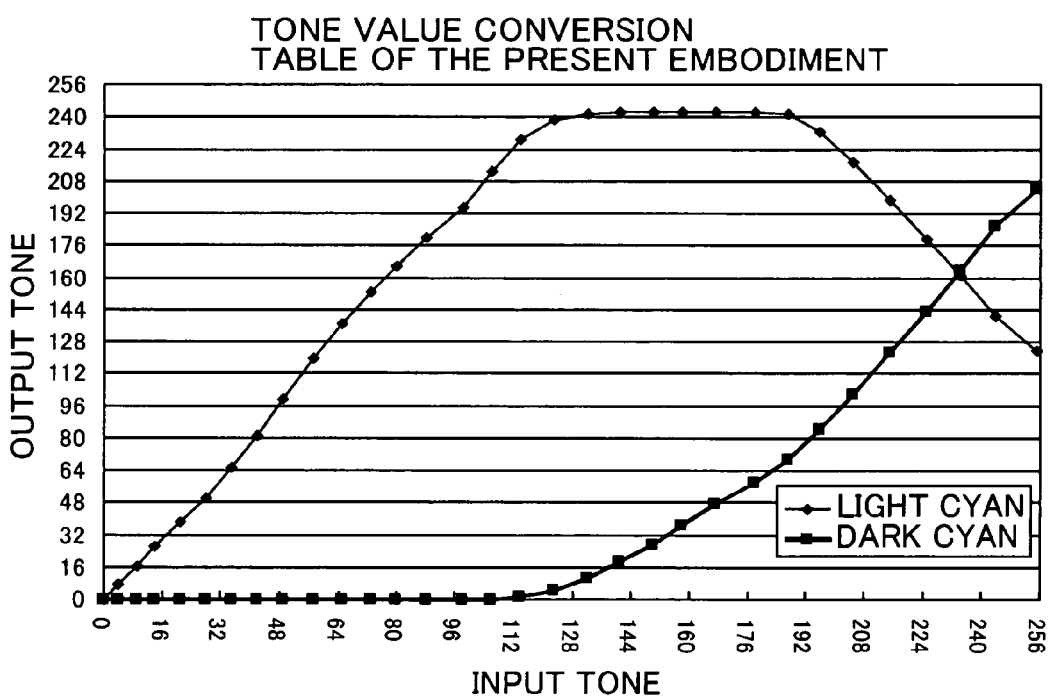
FIG. 13B is an explanatory diagram of a tone value conversion table of the present embodiment.

FIG. 13B is an explanatory diagram of a tone value conversion table of this embodiment. The horizontal axis indicates the input tone value (0 to 255) and the vertical axis indicates the output tone value (0 to 255). In FIG. 13B the thin line indicates the profile of light cyan and the thick line indicates the profile of dark cyan.

According to the tone value conversion table of this embodiment, when the above-described process in S202 is performed, if, for example, the cyan pixel data indicates "128", the printer driver acquires the LC pixel data for light cyan, which is "241", and acquires the DC pixel data for dark cyan, which is "8".

In this manner, the printer driver converts the cyan tone value (tone value of a certain color) to the light cyan tone value (corresponding to "a first light tone value indicating the tone of light color in 256 tones") and the dark cyan tone value (corresponding to "a first dark tone value indicating the tone of dark color in 256 tones").

Compared with the comparative example in FIG. 13A, although the C pixel data has the same tone value of "128", the DC pixel data value indicating the dark cyan tone value in the present embodiment is lower than that in the comparative example.

Also, in the tone value conversion table of the present embodiment, the dark cyan tone value (the output tone of the vertical axis, DC pixel data) is "0" while the cyan tone value (the input tone value of the horizontal axis) is equal to or smaller than "106". When the cyan tone value exceeds "106", the dark cyan tone value becomes greater than "0", and the generation of dots in dark cyan ink is started. In other words, compared with the comparative example of FIG. 13A, the generation of dark cyan dots is started at a higher cyan tone value in the present embodiment than in the comparative example.

Dot Generation Ratio Table of the Present Embodiment

Figure 15A:
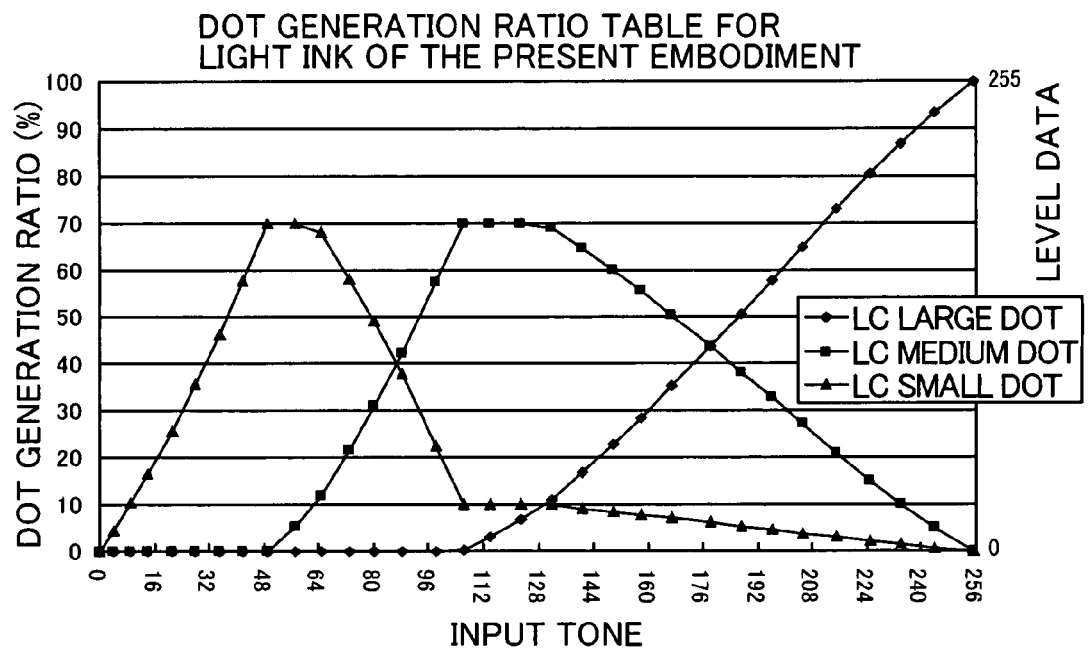
FIG. 15A is an explanatory diagram of a dot generation ratio table for light cyan of the present embodiment.
Figure 15B:
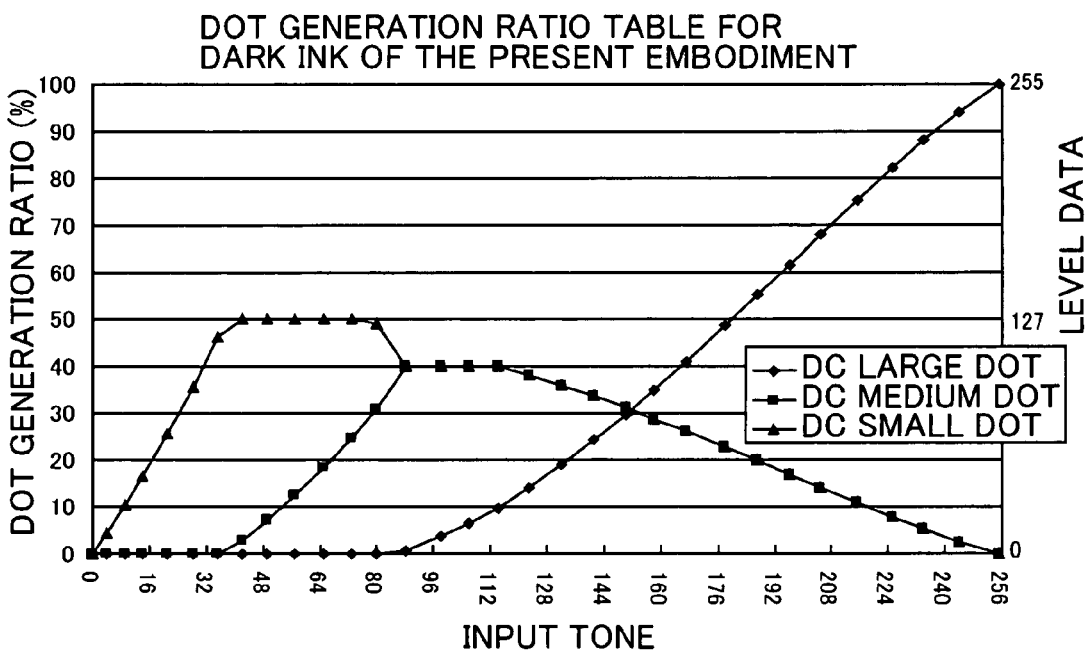
FIG. 15B is an explanatory diagram of a dot generation ratio table for dark cyan of the present embodiment.

FIG. 15A is an explanatory diagram of a dot generation ratio table for light cyan of the present embodiment. FIG. 15B is an explanatory diagram of a dot generation ratio table for dark cyan of the present embodiment. In the present embodiment, the dot generation ratio table for light cyan and the dot generation ratio table dark cyan are separately provided.

When the above-described process in S203 is performed, after the LC pixel data and DC pixel data have been acquired based on the above-described tone value conversion tables, the printer driver converts 8-bit LC pixel data for light cyan (corresponding to the first tone value) to 2-bit LC pixel data based on the dot generation ratio table for light cyan.

Specifically, the printer driver sets large dot level data LVL corresponding to the tone value of the LC pixel data, based on the dot generation ratio table in FIG. 15A. Then, the printer driver judges whether or not the large level data LVL exceeds a threshold value THL. If the printer driver judges that the large dot level data LVL is larger than the threshold value THL, it converts the LC pixel data of the corresponding pixel to "11", and terminates the process for the LC pixel data. On the other hand, when the printer driver judges that the large dot level data LVL is equal to or smaller than the threshold value THL, it sets medium dot level data LVM corresponding to the tone value of the LC pixel data, based on the dot generation ratio table in FIG. 15A. Then, when the printer driver judges that the medium dot level data LVM is larger than a threshold value THM, it converts the LC pixel data of the corresponding pixel to "10" and terminates the process for the LC pixel data. Further, when the printer driver judges that the medium dot level data LVM is equal to or smaller than the threshold value THM, it sets small dot level data LVS corresponding to the tone value of the LC pixel data, based on the dot generation ratio table in FIG. 15A. Then, when the printer driver judges that the small dot level data LVS is larger than a threshold value THS, it converts the pixel data of the corresponding pixel to "01" and terminates the process for the pixel data. When the printer driver judges that the small dot level data LVS is equal to or smaller than the threshold value THS, it converts the pixel data of the corresponding pixel to "00", and terminates the process for the pixel data. In this manner, the printer driver converts 8-bit LC pixel data (corresponding to the "first light tone value") to 2-bit LC pixel data (corresponding to a "second light tone value"). The printer driver performs this process on all LC pixel data. As a result, the printer driver acquires LC image data composed of 2-bit LC pixel data based on C image data composed of 8-bit C pixel data.

Similar to the case of light cyan, when the above-described process in S204 is performed, the printer driver converts 8-bit DC pixel data for dark cyan (corresponding to a "first dark tone value") to 2-bit DC pixel data (corresponding to a "second dark tone value") based on the dot generation ratio table for dark cyan. As a result, the printer driver acquires DC image data composed of 2-bit DC pixel data based on C image data composed of 8-bit C pixel data.

2-bit LC pixel data and 2-bit DC pixel data obtained through the halftone process described above are transmitted to the printer 1 as print data from the computer 110. The printer 1 ejects light cyan ink from the light cyan ink nozzle group LC according to the LC pixel data (corresponding to the "second light tone value"), and forms dots in light ink (light dots) on paper. Also, the printer 1 ejects dark cyan from the dark cyan ink nozzle group DC according to the DC pixel data (corresponding to the "second dark tone value"), and forms dots in dark cyan ink (dark dots) on paper. The tone of a cyan image of an image printed on paper is expressed by the dots formed in light cyan ink and the dots formed in dark cyan ink.

In the present embodiment, the maximum generation ratio for the small dots in light cyan ink is set to 70%. In other words, in the dot generation ratio table for light cyan of the present embodiment, the maximum generation ratio of the small dot is set to 70%.

Therefore, the tone of cyan in the printed image is expressed only with small dots until the generation ratio of small dots in light cyan ink reaches 70%. That is, in this embodiment, no medium dots in light cyan ink are generated until the generation ratio of small dots in light cyan ink reaches 70%. In this embodiment, the small dot generation ratio reaches 70% when the tone value indicated by the LC pixel data (the tone value of light cyan) is "50". Therefore, no medium dots in light cyan ink are generated while the tone value of light cyan is not more than "50".

Also in the present embodiment, the maximum generation ratio of medium dots in light cyan ink is set to 70%. In other words, in the dot generation ratio table for light cyan of this embodiment, the maximum generation ratio of medium dot is set to 70%.

Therefore, the tone of cyan in the printed image is expressed only with small and medium dots until the generation ratio of medium dots in light cyan ink reaches 70%. That is, in this embodiment, no large dots in light cyan ink are generated until the generation ratio of medium dots in light cyan ink reaches 70%. In this embodiment, the medium dot generation ratio reaches 70% when the tone value indicated by the LC pixel data (the tone value of light cyan) is "106". Therefore, no large dots in light cyan ink are generated while the tone value of light cyan is not more than "106".

The dot generation ratio table for dark cyan ink of this embodiment is similar to the dot generation ratio table of the above-described comparative example. Therefore, the generation ratio of small dots in dark cyan ink is set so as not to exceed 50%. For this reason, even if the position of small dots in dark cyan ink is shifted, deterioration of image quality can be suppressed. If the generation ratio of small dots in dark cyan ink reaches 70%, many dots are formed shifted from their original positions, which are highly noticeable, and image quality deteriorates.

Comparison

The comparative example and this embodiment are compared below.

Small Dot Generation Ratio

First, FIG. 14 is compared with FIGS. 15A and 15B.

In the above-described comparative example, a common dot generation ratio table is used for light cyan and dark cyan. In other words, the printer driver converts 8-bit LC pixel data (light cyan tone value in 256 tones) to 2-bit data using the dot generation ratio table shown in FIG. 14, and converts 8-bit DC pixel data (dark cyan tone value in 256 tones) to 2-bit data using the same dot generation ratio table.

Incidentally, small ink droplets are susceptible to flight path deviation during flight. When the position of small dark cyan dots is shifted, the image quality will be further deteriorated. Therefore, it is necessary to set the dot generation ratio table such that the generation ratio of small dots in dark cyan ink does not exceed 50%. In the comparative example, setting the dot generation ratio table in this manner makes it impossible for the generation ratio of small light cyan dots to exceed 50%.

On the other hand, in this embodiment, respective dot generation ratio tables are provided for light cyan and dark cyan. Therefore, the maximum generation ratio of small light cyan dots and that of small dark cyan dots can be set separately.

Also in the present embodiment, the maximum generation ratio of small dots of the dot generation ratio table for light cyan is set to a higher value than the maximum generation ratio of small dots of the dot generation ratio table for dark cyan. Specifically, while the maximum small dot generation value of the dot generation ratio table for dark cyan is set to 50%, the maximum small dot generation value of the dot generation ratio table for light cyan is set to 70%. It should be noted that in the present embodiment, the maximum generation ratio of medium dots of the dot generation ratio table for light cyan is set to a higher value than the maximum generation ratio of small dots of the dot generation ratio table for dark cyan. Specifically, while the maximum generation value of small dots of the dot generation ratio table for dark cyan is set to 40%, the maximum generation value of small dots of the dot generation ratio table for light cyan is set to 70%.

In the present embodiment, the effects described below, which is different from the comparative example, can be achieved by using the above-described dot generation ratio table.

Tones of Dots Formed in Dark Cyan Ink

Figure 16A:
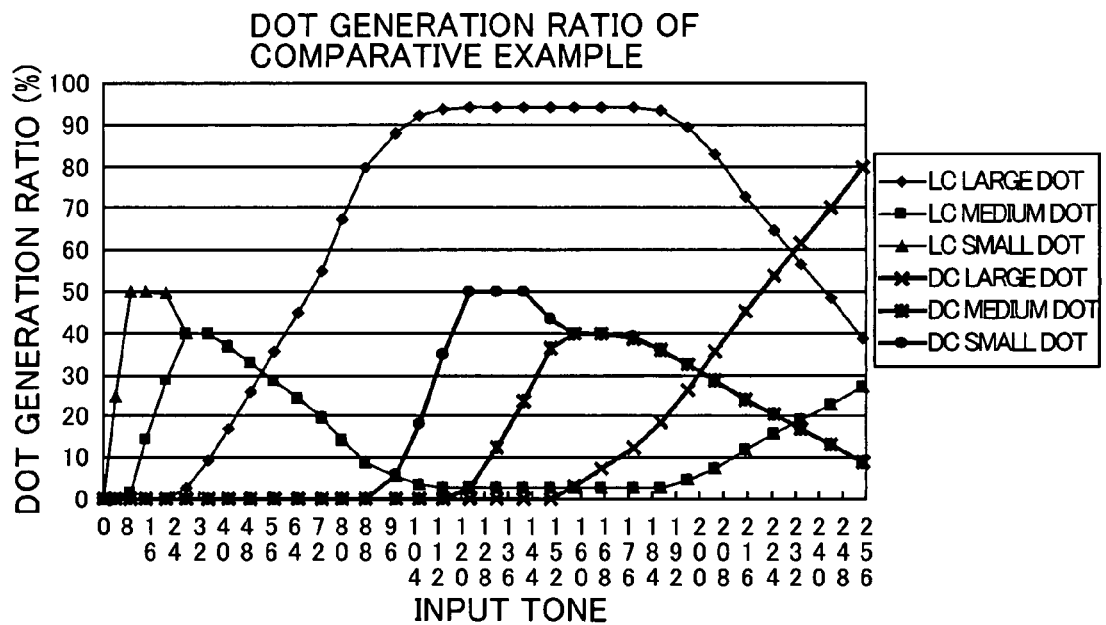
FIGS. 16A and 16B are graphs showing the appearance status of respective dots (small dots, medium dots, and large dots) of respective inks (light cyan ink and dark cyan ink) with respect to the tone value of cyan.
Figure 16B:
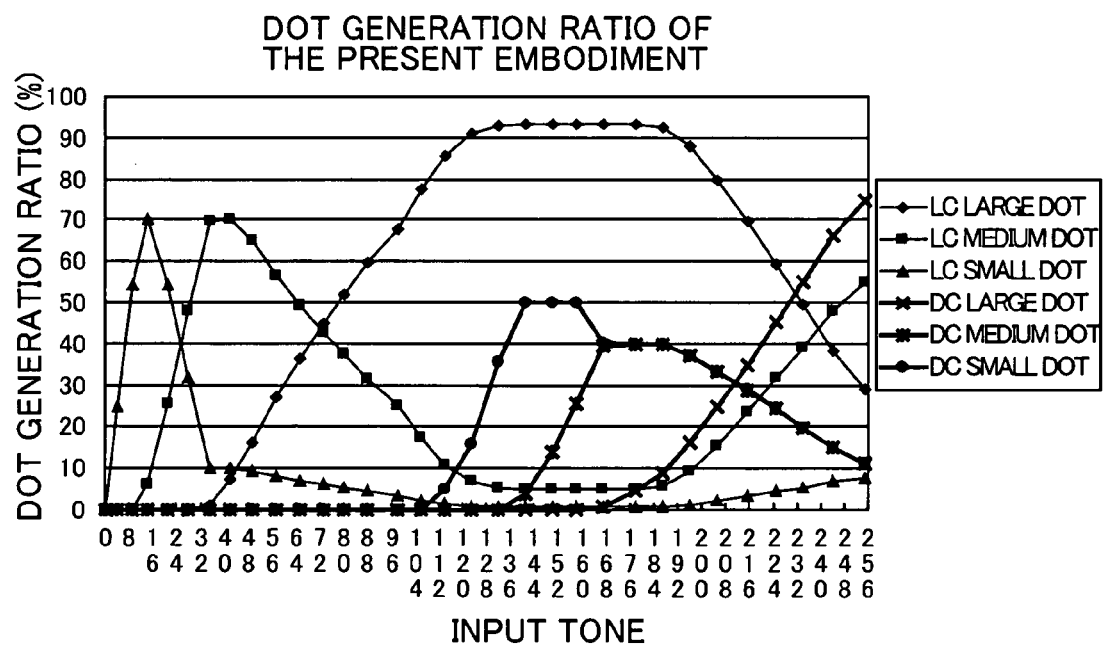

FIGS. 16A and 16B are graphs showing the appearance status of the dots (small dots, medium dots, large dots) in both inks (light cyan ink and dark cyan ink) with respect to the cyan tone value. FIG. 16A shows the appearance status in the comparative example, and FIG. 16B shows the appearance status in the present embodiment. The horizontal axis of the graph indicates the cyan tone value (0 to 255), and the vertical axis indicates the dot generation ratio (0 to 100%).

Now, the comparative example and this embodiment are compared in terms of the tone values at which generation of various dots in dark cyan ink is started, by comparing FIGS. 13A and 13B, as well as FIGS. 16A and 16B.

First, in the comparative example, as shown in FIG. 13A, when the tone value of cyan (the input tone indicated by the horizontal axis) exceeds "88", the tone value of dark cyan becomes greater than "0". As a result, in the comparative example, as shown in FIG. 16A, when the tone value of cyan (input tone indicated by the horizontal axis) exceeds "88", small dark cyan dots are generated.

On the other hand, in the present embodiment, as shown in FIG. 13B, when the tone value of cyan (the input tone indicated by the horizontal axis) exceeds "106", the tone value of dark cyan becomes greater than "0". As a result, in this embodiment, as shown in FIG. 16B, when the tone value of cyan (the input tone indicated by the horizontal axis) exceeds "106", small dark cyan dots are generated. In other words, in this embodiment, the tone of cyan is expressed only with light cyan dots when the tone value of cyan is equal to or smaller than "106".

For this reason, in the present embodiment, the range of cyan tones that can be expressed only with light cyan ink is broader than in the comparative example. In addition, in this embodiment, since the generation of dark cyan dots starts at a comparatively high cyan tone value, dots in dark cyan ink appear in an image having a comparatively deep tone. For this reason, in the present embodiment, dots in dark cyan ink are less noticeable than in the comparative example, resulting in an image with excellent graininess.

Further, even when the small dark cyan dots are formed shifted, since the generation of dark cyan dots starts at a comparatively high cyan tone value in this embodiment, such shifted dots are not so noticeable, thereby suppressing deterioration of image quality.

Ink Amount

Figure 17:
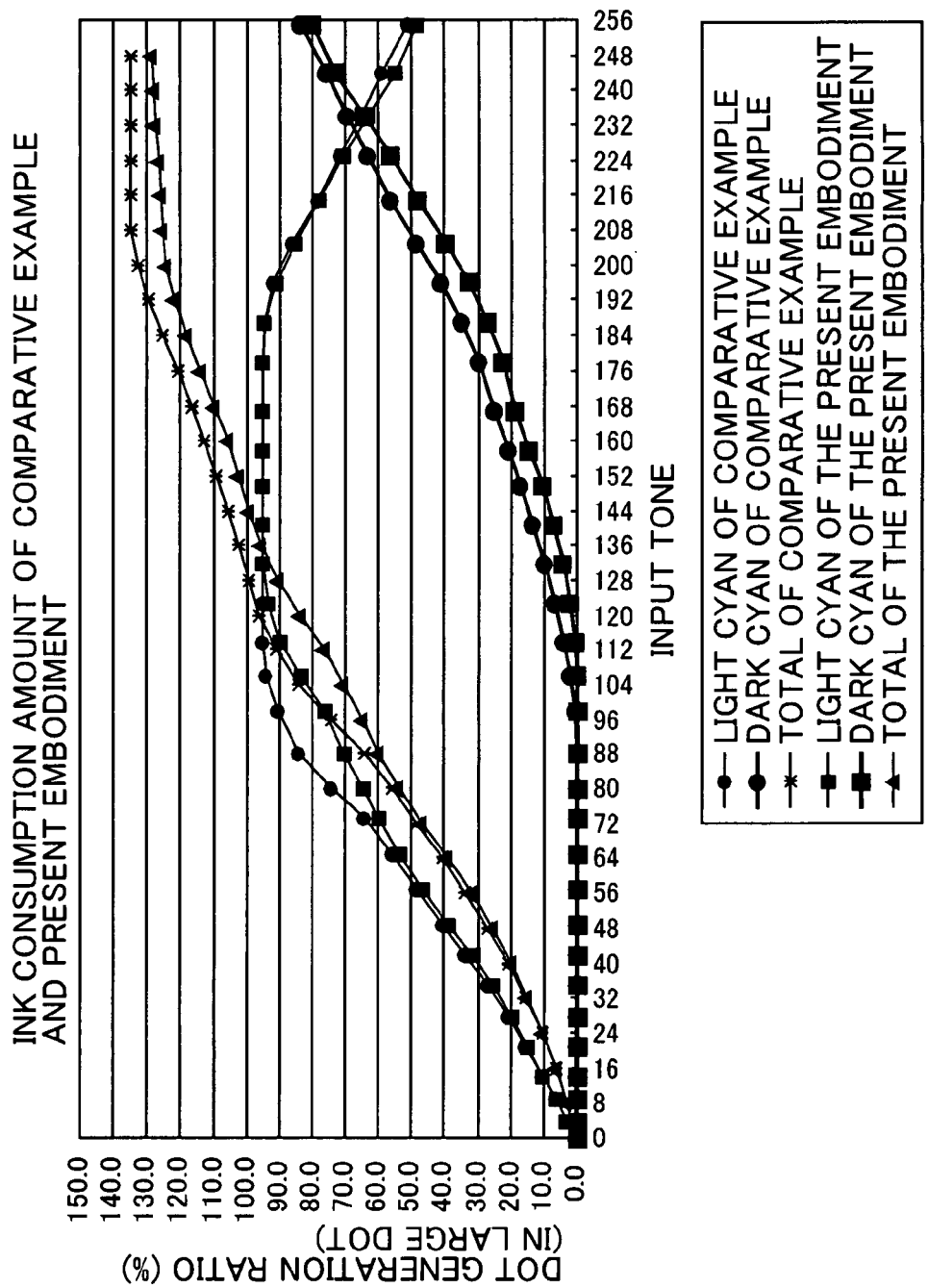
FIG. 17 is a graph showing ink consumption amount with respect to the tone value of cyan.

FIG. 17 is a graph showing ink consumption amount with respect to the cyan tone value. In FIG. 17, the ink consumption amount in the comparative example and this embodiment is shown. The horizontal axis of the graph indicates the cyan tone value (0 to 255), and the vertical axis indicates the dot generation ratio (0 to 100%). Note that, in FIG. 17, the ink consumption amount is shown by the dot generation ratio in large dot. For example, when the appearance ratio of small dots (2.5 pl) is 50%, the dot generation ratio in large dots is approximately 6% ($\approx$2.5 pl$\times$50%$\div$21 pl).

The larger the amount of ink ejected on the paper, the wetter the paper becomes, and the paper easily gets wrinkled. For this reason, it is preferable that a small amount of ink is ejected onto the paper. Comparing the consumption amount of ink in this embodiment and the comparative example, the present embodiment consumes a lesser amount of ink.

Other Embodiments

The foregoing embodiment described primarily a printer. However, it goes without saying that the foregoing description also includes the disclosure of printing apparatuses, recording apparatuses, liquid ejection apparatuses, printing methods, recording methods, liquid ejection methods, printing systems, recording systems, computer systems, programs, storage media storing programs, display screens, screen display methods, and methods for producing printed material, for example.

Also, a printer, for example, serving as an embodiment was described above. However, the foregoing embodiment is for the purpose of elucidating the invention and is not to be interpreted as limiting the invention. The invention can of course be altered and improved without departing from the gist thereof and includes functional equivalents. In particular, embodiments mentioned below are also included in the invention.

Carriage

In the foregoing embodiment, the head is mounted in the carriage. However, it is not required for the head to be mounted in carriage. For example, in a so-called line printer, a large number of heads are fixed aligned in the width direction of the paper, which makes the carriage unnecessary. The technique of the foregoing embodiment can be applied to such a line printer as well.

Dot Size

In the foregoing embodiment, expression in four tones (no dot, small dot, medium dot and large dot) is possible for one pixel on the paper. However, there is no limitation to this. For example, expression in two tones (no dot or dot formed) per pixel, or expression in six tones (no dot, fine dot, small dot, medium dot, large dot, extra-large dot) per pixel is possible.

Nozzles

In the foregoing embodiment, ink was ejected using piezoelectric elements. However, the method for ejecting liquid is not limited to this. Other methods, such as a method for generating bubbles in the nozzles through heat, may also be employed.

What is claimed is:

1. A printing method comprising:

using a print control apparatus for converting a tone value indicating a tone of a certain color to a first light tone value indicating a tone of a light color using a predetermined number of tones, and a first dark tone value indicating a tone of a dark color using a predetermined number of tones;

converting the first light tone value to a second light tone value indicating a tone of the light color with a smaller number of tones than the predetermined number of tones, based on a table for the light color;

converting the first dark tone value to a second tone value indicating a tone of the dark color with a smaller number of tones than the predetermined number of tones, based on a table for the dark color other than the table for the light color;

ejecting a light ink based on the second light tone value to form a light dot in the light ink on a medium;

ejecting a dark ink based on the second dark tone value to form a dark dot in the dark ink on the medium; and expressing a tone of the certain color on the medium with the light dot and the dark dot.

2. A printing method according to claim 1, wherein the table for the light color and the table for the dark color are set such that a maximum number of the light dots per unit area is different from a maximum number of the dark dots per unit area.

3. A printing method according to claim 2, wherein the light dot can be formed in a plurality of sizes depending on the second light tone value, and the dark dot can be formed in a plurality of sizes depending on the second dark tone value.

4. A printing method according to claim 3, wherein the table for the light color and the table for the dark color are set such that a maximum number of the light dots in the smallest size per unit area is larger than a maximum number of the dark dots in the smallest size per unit area.

5. A printing method according to claim 1, wherein the table for the light color and a dither matrix are used in converting the first light tone value to the second light tone value, and the table for the dark color and the dither matrix are used in converting the first dark tone value to the second dark tone value.

6. A printing system comprising:

a print control apparatus that converts a tone value indicating a tone of a certain color to a first light tone value indicating a tone of a light color using a predetermined number of tones, and a first dark tone value indicating a tone of a dark color using a predetermined number of tones, that converts the first light tone value to a second light tone value indicating a tone of the light color with a smaller number of tones than the predetermined number of tones, based on a table for the light color, and
that converts the first dark tone value to a second tone value indicating a tone of the dark color with a smaller number of tones than the predetermined number of tones, based on a table for the dark color other than the table for the light color; and a printing apparatus that ejects a light ink based on the second light tone value to form a light dot in the light ink on a medium,
that ejects a dark ink based on the second dark tone value to form a dark dot in the dark ink on the medium, and
that expresses a tone of the certain color on the medium with the light dot and the dark dot.

* * * * *